US011855842B1

(12) United States Patent
Fishman et al.

(10) Patent No.: US 11,855,842 B1
(45) Date of Patent: Dec. 26, 2023

(54) PRIMARY ENTITY REQUESTING FROM ONLINE SERVICE PROVIDER (OSP) TO PRODUCE A RESOURCE AND TO PREPARE A DIGITAL EXHIBIT THAT REPORTS THE RESOURCE, RECEIVING FROM THE OSP AN ACCESS INDICATOR THAT LEADS TO THE DIGITAL EXHIBIT, AND SENDING THE ACCESS INDICATOR TO SECONDARY ENTITY

(71) Applicant: Avalara, Inc., Seattle, WA (US)

(72) Inventors: Jayme Fishman, Boxford, MA (US); Andrew Brandon Chan, Chapel Hill, NC (US); Gregory T. Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 0 days.

(21) Appl. No.: 18/173,014

(22) Filed: Feb. 22, 2023

Related U.S. Application Data

(60) Provisional application No. 63/319,941, filed on Mar. 15, 2022.

(51) Int. Cl.
G06F 15/177 (2006.01)
H04L 41/084 (2022.01)
H04L 41/0895 (2022.01)
G06K 7/14 (2006.01)

(52) U.S. Cl.
CPC .......... H04L 41/084 (2013.01); G06K 7/1417 (2013.01); H04L 41/0895 (2022.05)

(58) Field of Classification Search
CPC .. H04L 41/084; H04L 41/0895; G06K 7/1417
See application file for complete search history.

(56) References Cited

U.S. PATENT DOCUMENTS

| 7,783,536 | B2 | 8/2010 | William et al. |
| 7,933,803 | B1 | 4/2011 | Nadler et al. |
| 8,620,578 | B1 | 12/2013 | Brown et al. |

(Continued)

FOREIGN PATENT DOCUMENTS

| EP | 3568965 B1 | * 4/2023 | ............ G06F 21/34 |
| KR | 102342631 B1 | * 12/2021 | |
| WO | WO-2019068893 A1 | * 4/2019 | |

*Primary Examiner* — Richard G Keehn
(74) *Attorney, Agent, or Firm* — Nicholson, De Vos, Webster & Elliott, LLP

(57) ABSTRACT

In embodiments, a computer system of a primary entity receives from a secondary entity a first communication about a relationship instance between the primary entity and the secondary entity, and transmits to an Online Service Provider (OSP) a second communication with a dataset. The dataset has dataset parameters about the relationship instance. The second communication causes the OSP to select a file template per the dataset, to produce a resource for the dataset, and to prepare a digital exhibit that is arranged to report the resource as answering the identified requirement. The OSP then transmits to the computer system a third communication that includes an access indicator adapted to facilitate viewing the digital exhibit. Upon receiving the third communication, the computer system transmits a fourth communication to the device of the secondary entity, the fourth communication including the access indicator.

12 Claims, 27 Drawing Sheets

METHODS

(56) References Cited

U.S. PATENT DOCUMENTS

| | | |
|---|---|---|
| 8,725,407 B2 | 5/2014 | Hurley et al. |
| 9,369,287 B1* | 6/2016 | Sarvestani ............... G07D 7/01 |
| 9,760,915 B2 | 9/2017 | Pavlou et al. |
| 10,332,216 B2 | 6/2019 | Barsade et al. |
| 10,445,818 B1 | 10/2019 | Chowdhary |
| 10,769,611 B2 | 9/2020 | Mcneel |
| 10,872,100 B1 | 12/2020 | Shefferman et al. |
| 11,176,620 B1 | 11/2021 | Lubczynski et al. |
| 11,238,542 B1* | 2/2022 | Wixted .............. G06Q 30/0633 |
| 2002/0138765 A1 | 9/2002 | Fishman et al. |
| 2007/0136158 A1 | 6/2007 | Rawlings et al. |
| 2007/0136159 A1 | 6/2007 | Rawlings et al. |
| 2009/0187500 A1 | 7/2009 | Wilson et al. |
| 2013/0013471 A1 | 1/2013 | Fishman |
| 2014/0172656 A1 | 6/2014 | Shaw |
| 2014/0351105 A1 | 11/2014 | Hamm |
| 2015/0334108 A1* | 11/2015 | Khalil ................. H04L 63/0815 |
| | | 726/8 |
| 2016/0042466 A1 | 2/2016 | Herndon et al. |
| 2016/0140668 A1 | 5/2016 | Maguire et al. |
| 2019/0114609 A1 | 4/2019 | Burton et al. |
| 2020/0035339 A1* | 1/2020 | Eevani ................. H04L 9/0819 |
| 2021/0034830 A1* | 2/2021 | Govindaraj .......... G06Q 50/205 |
| 2021/0158456 A1 | 5/2021 | Morgan et al. |
| 2022/0078008 A1* | 3/2022 | Kong .................... H04L 9/3297 |
| 2023/0109465 A1* | 4/2023 | Ho ................... G06K 19/06037 |
| | | 705/3 |
| 2023/0196830 A1* | 6/2023 | Weksler ................. G06V 40/45 |
| | | 348/77 |

\* cited by examiner

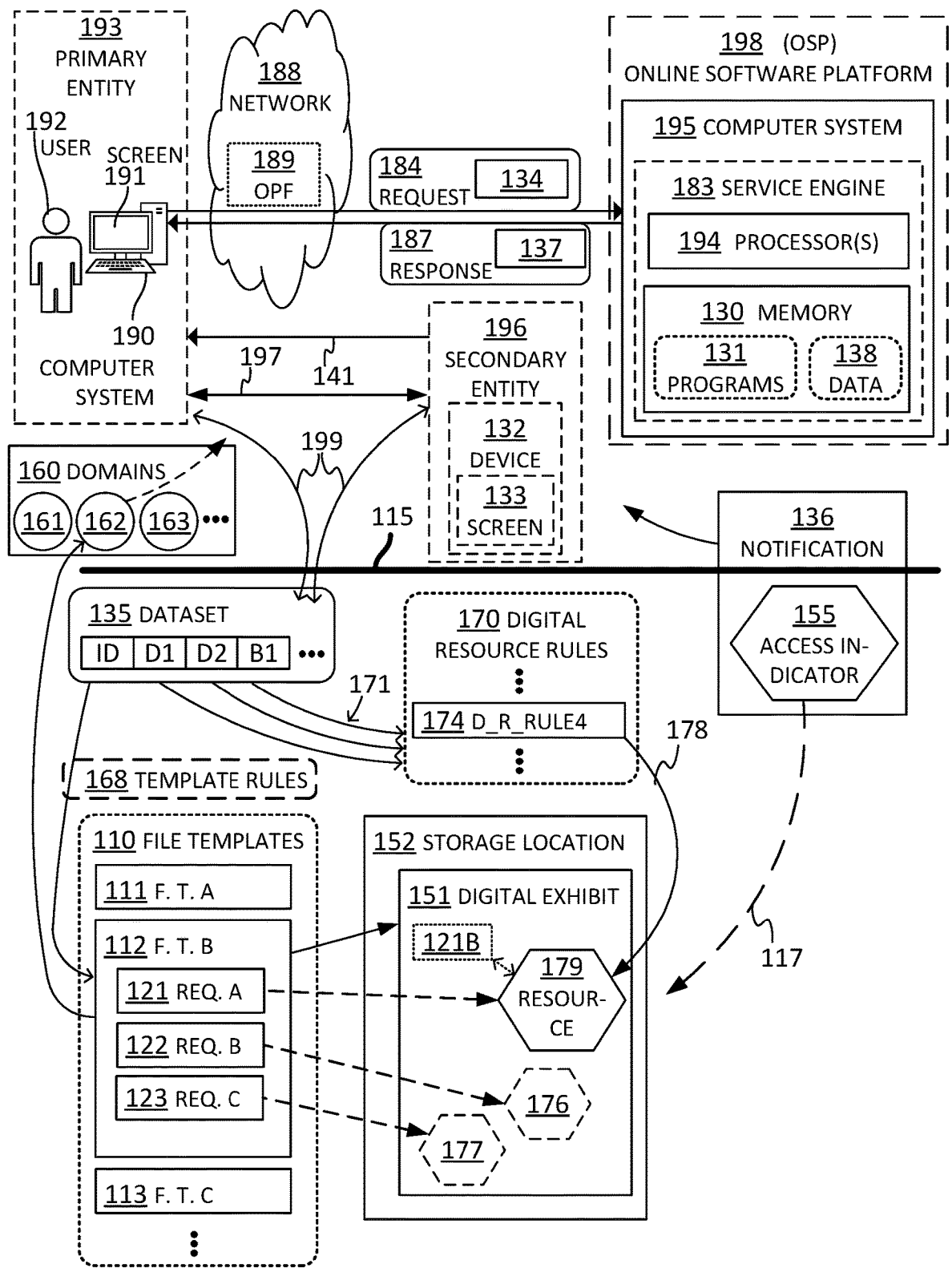
FIG. 1 *EMBODIMENTS*

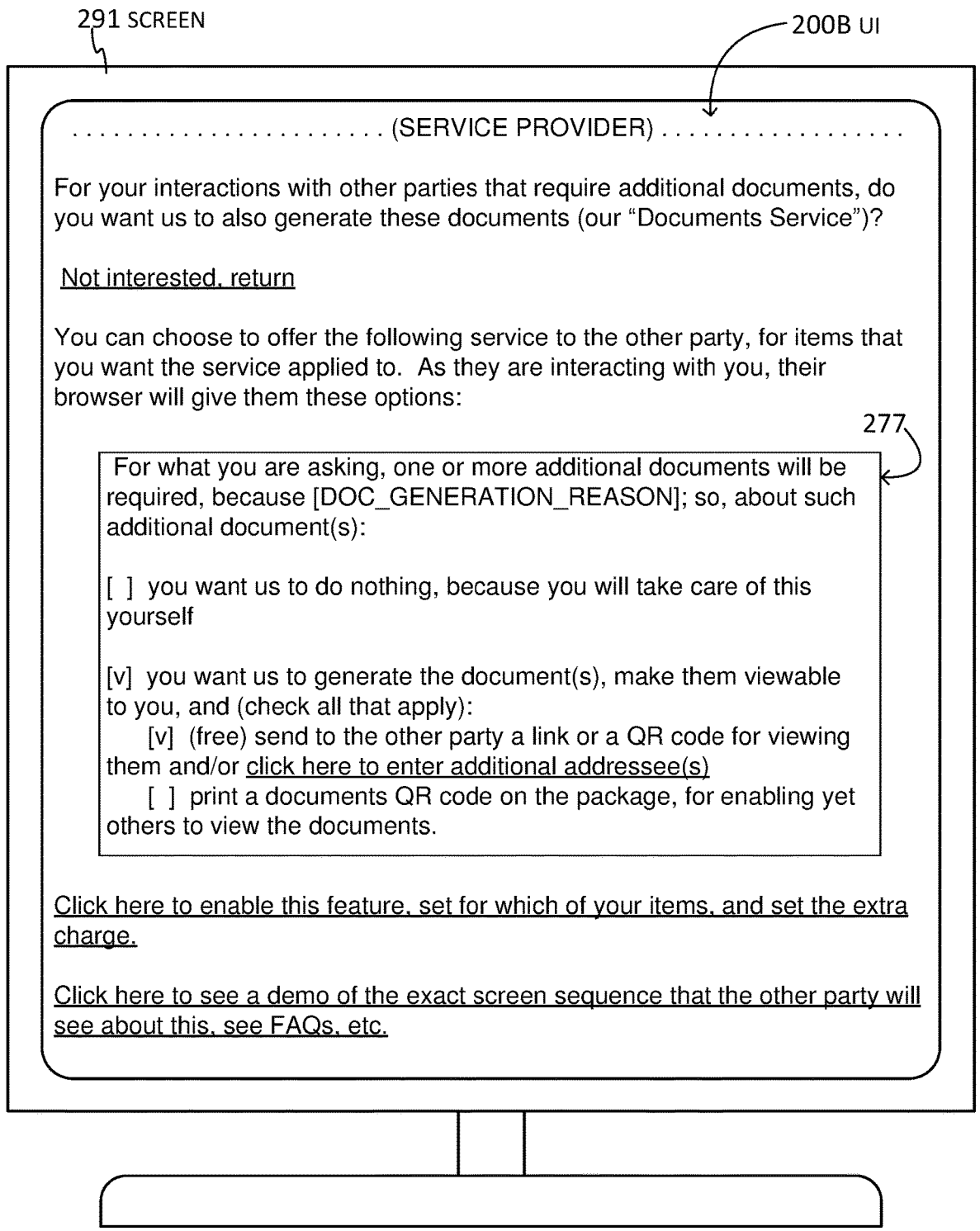
FIG. 2B     *USER INTERFACE (UI)*

*DATASET VALUES INVOKING DIFFERENT TYPES OF POSSIBLE DIGITAL RESOURCE RULES*

DIGITAL EXHIBIT

FIG. 7 — *DIGITAL EXHIBIT VIEWABLE IN SUPERPOSITION WITH FILE TEMPLATE*

FIG. 8  *EMBODIMENTS*

SAMPLE ACCESS INDICATOR
(QR CODE)

FIG. 15 METHODS

FIG. 16  *EMBODIMENTS*

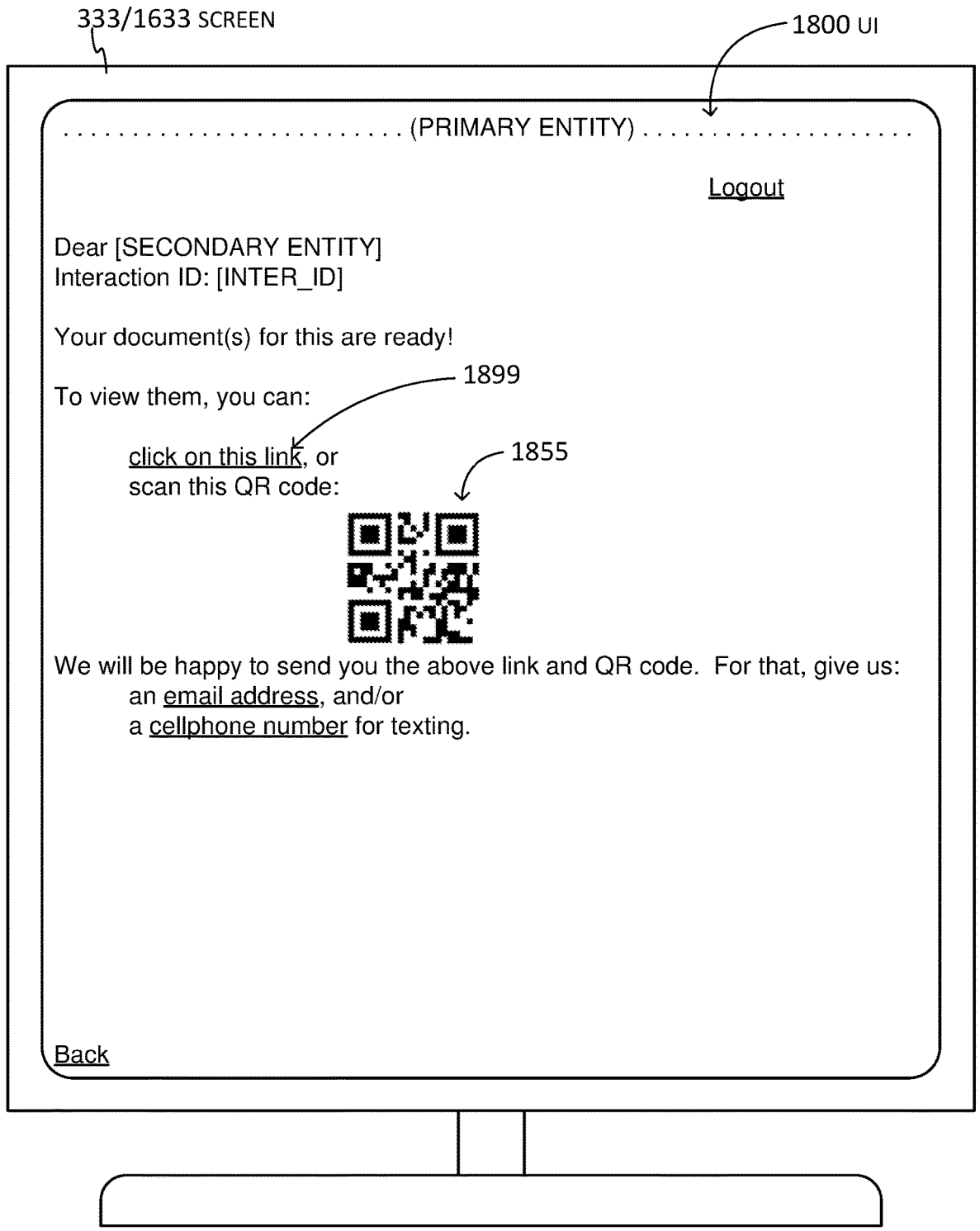
FIG. 18  *USER INTERFACE (UI)*

1900

1910 RECEIVE FIRST COMMUNICATION FROM DEVICE OF SECONDARY ENTITY

1920 CAUSE SECOND COMMUNICATION TO BE TRANSMITTED TO SERVICE ENGINE OF AN OSP; THE SECOND COMMUNICATION PROGRAMMED TO CAUSE THE SERVICE ENGINE TO PREPARE DIGITAL EXHIBIT, AND TO CAUSE TO BE TRANSMITTED BACK TO THE COMPUTER SYSTEM THIRD COMMUNICATION THAT INCLUDES ACCESS INDICATOR TO FACILITATE VIEWING THE DIGITAL EXHIBIT

1930 RECEIVE THE THIRD COMMUNICATION

1940 CAUSE FOURTH COMMUNICATION TO BE TRANSMITTED TO DEVICE OF SECONDARY ENTITY, WHICH INCLUDES THE ACCESS INDICATOR

*METHODS*

FIG. 19

USE CASE WHERE SALE REQUIRES PAYMENT AND DOCUMENT ABOUT THE PAYMENT

*DATASET VALUES INVOKING DIFFERENT TYPES OF POSSIBLE DIGITAL TAX RULES*

USE CASE

USE CASE

USE CASE – PARCEL SUBJECT TO DOCUMENT REQUIREMENTS BY AUTHORITY OF JURISDICTION

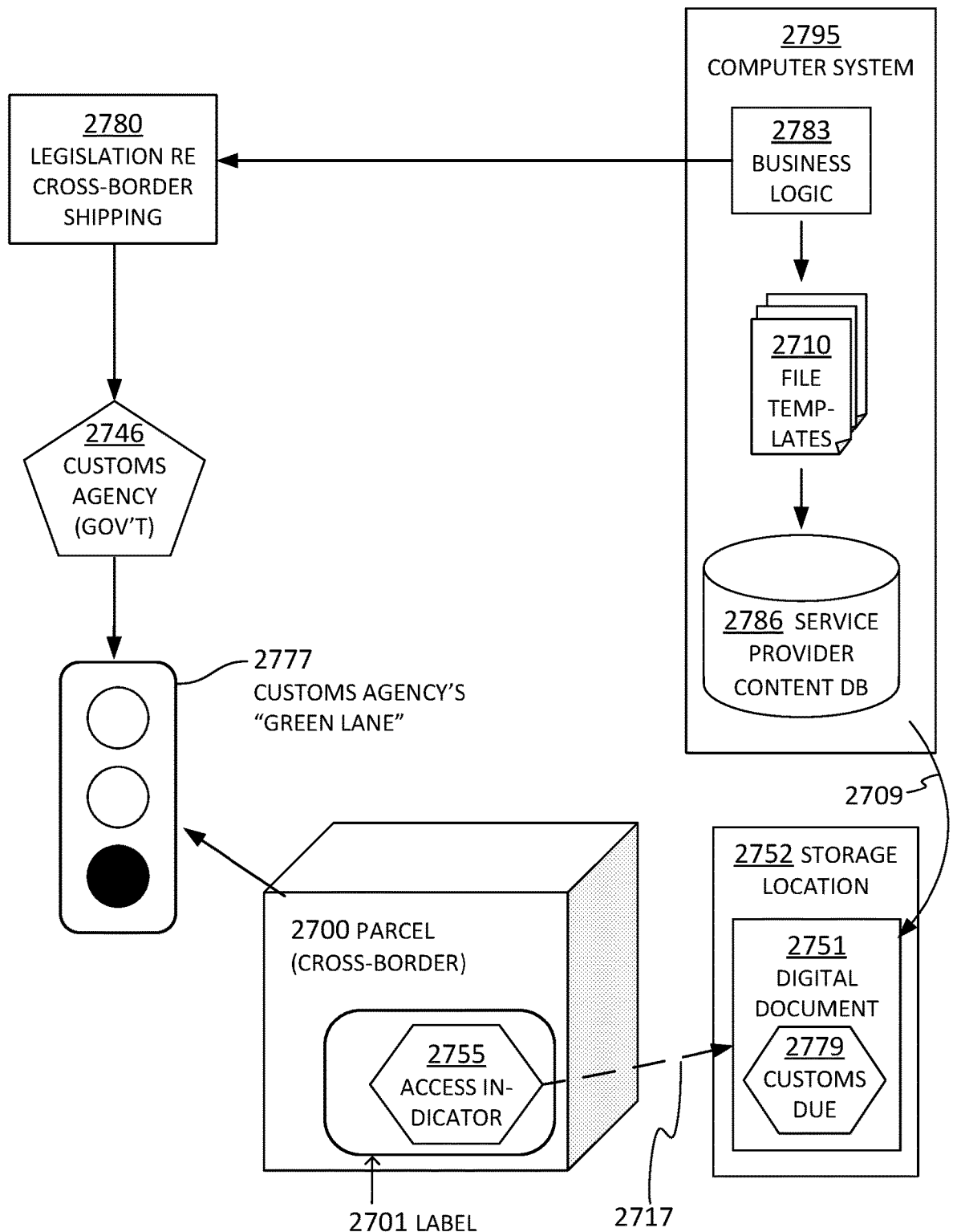
FIG. 27  *USE CASE – CUSTOMS*

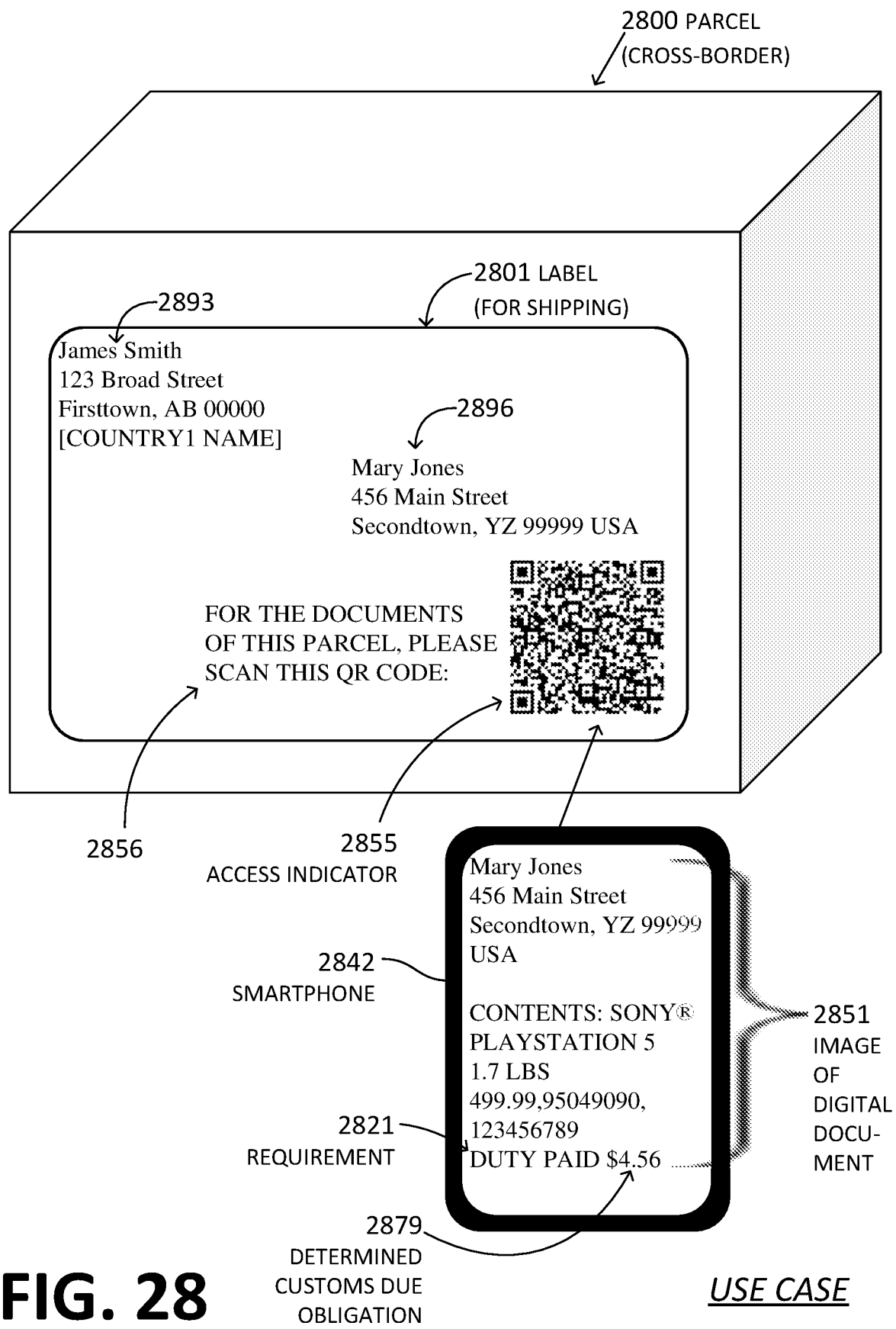
FIG. 28     USE CASE

PRIMARY ENTITY REQUESTING FROM ONLINE SERVICE PROVIDER (OSP) TO PRODUCE A RESOURCE AND TO PREPARE A DIGITAL EXHIBIT THAT REPORTS THE RESOURCE, RECEIVING FROM THE OSP AN ACCESS INDICATOR THAT LEADS TO THE DIGITAL EXHIBIT, AND SENDING THE ACCESS INDICATOR TO SECONDARY ENTITY

CROSS-REFERENCE TO RELATED APPLICATIONS

This patent application claims priority from U.S. provisional patent application Ser. No. 63/319,941, filed on Mar. 15, 2022.

This patent application may be found to be related to U.S. patent application Ser. No. 18/173,021, filed as an application on the same day as the instant document, and due to be assigned to the same assignee.

BACKGROUND

Computer utilities exist for producing resources, even online. Yet, providing, in a timely and efficient manner, accurate and reliable exhibits that report these resources presents a technical problem for current ERP (Enterprise Resource Planning) applications.

All subject matter discussed in this Background section of this document is not necessarily prior art, and may not be presumed to be prior art simply because it is presented in this Background section. Plus, any reference to any prior art in this description is not, and should not be taken as, an acknowledgement or any form of suggestion that such prior art forms parts of the common general knowledge in any art in any country. Along these lines, any recognition of problems in the prior art discussed in this Background section or associated with such subject matter should not be treated as prior art, unless expressly stated to be prior art. Rather, the discussion of any subject matter in this Background section should be treated as part of the approach taken towards the particular problem by the inventors. This approach in and of itself may also be inventive.

SUMMARY

The present description gives instances of computer systems, storage media that may store programs, and methods for making computations, preparing digital exhibits that report the computations, and even making access indicators that render such digital exhibits easy to find.

In embodiments, an Online Software Platform (OSP) receives a dataset about a relationship instance between a primary entity and a secondary entity. The OSP parses the dataset to identify a certain domain that is associated with the primary entity or the secondary entity. The OSP selects a file template associated with the certain domain, and identifies a requirement mentioned in the selected file template. The OSP selects a digital resource rule responsive to the dataset, and produces a resource by applying the selected digital resource rule to the dataset. The OSP prepares, from the selected file template, a digital exhibit that is arranged to report the resource as answering the identified requirement. The OSP then sends to another device a notification that includes an access indicator adapted to facilitate viewing the digital exhibit.

An advantage and/or benefit from using a single set of data, namely the dataset, both for the selection of the file template and for the production of the resource, can be that the resulting digital exhibits can be prepared more accurately, reliably, efficiently, and in a way that integrates well into existing technical environments. In addition, computing utilities and other resources can be conserved.

In embodiments, a computer system of a primary entity receives from a secondary entity a first communication about a relationship instance between the primary entity and the secondary entity, and transmits to an Online Service Provider (OSP) a second communication with a dataset. The dataset has dataset parameters about the relationship instance. The second communication causes the OSP to select a file template per the dataset, to produce a resource for the dataset, and to prepare a digital exhibit that is arranged to report the resource as answering the identified requirement. The OSP then transmits to the computer system a third communication that includes an access indicator adapted to facilitate viewing the digital exhibit. Upon receiving the third communication, the computer system transmits a fourth communication to the device of the secondary entity, the fourth communication including the access indicator.

An advantage and/or benefit can be that the secondary entity is enabled to automatically forward the access indicator to other entities, sometimes without having to receive the digital exhibit itself, all of which may reduce the need for computing resources.

As such, the present disclosure provides systems, computer-readable media, and methods that solve these technical problems by increasing the speed, efficiency and accuracy of such specialized software platforms and computer networks, thus improving the technology of ERP software applications.

Therefore, the systems and methods described herein improve the functioning of computer or other hardware, such as by reducing the processing, storage, and/or data transmission resources needed to perform various tasks, thereby enabling the tasks to be performed by less capable, less capacious, and/or less expensive hardware devices, enabling the tasks to be performed with less latency and/or preserving more of the conserved resources for use in performing other tasks or additional instances of the same task.

As such, it will be appreciated that embodiments may cause results that are larger than the sum of their individual parts, and have utility.

These and other features and advantages of the claimed invention will become more readily apparent in view of the embodiments described and illustrated in this specification, namely in this written specification and the associated drawings.

BRIEF DESCRIPTION OF THE DRAWINGS

FIG. 1 is a diagram showing sample aspects of embodiments, which are improvements in automated computerized systems.

FIG. 2B is a sample view of a User Interface (UI) that could follow the UI of FIG. 2A, in an embodiment during a setup phase.

FIG. 18 is a sample view of a User Interface (UI) seen on a screen of a device of a secondary entity of FIG. 1 or of FIG. 16 in an embodiment, which could follow the UI of FIG. 3 or of FIG. 17.

FIG. 19 is a flowchart for illustrating sample methods according to embodiments, which are improvements in automated computerized systems.

FIG. 27 is a composite diagram of disparate elements for describing a use case of embodiments.

FIG. 28 is a diagram of a sample use case of a parcel with a QR code for the use case of FIG. 27.

DETAILED DESCRIPTION

Figure 2A:
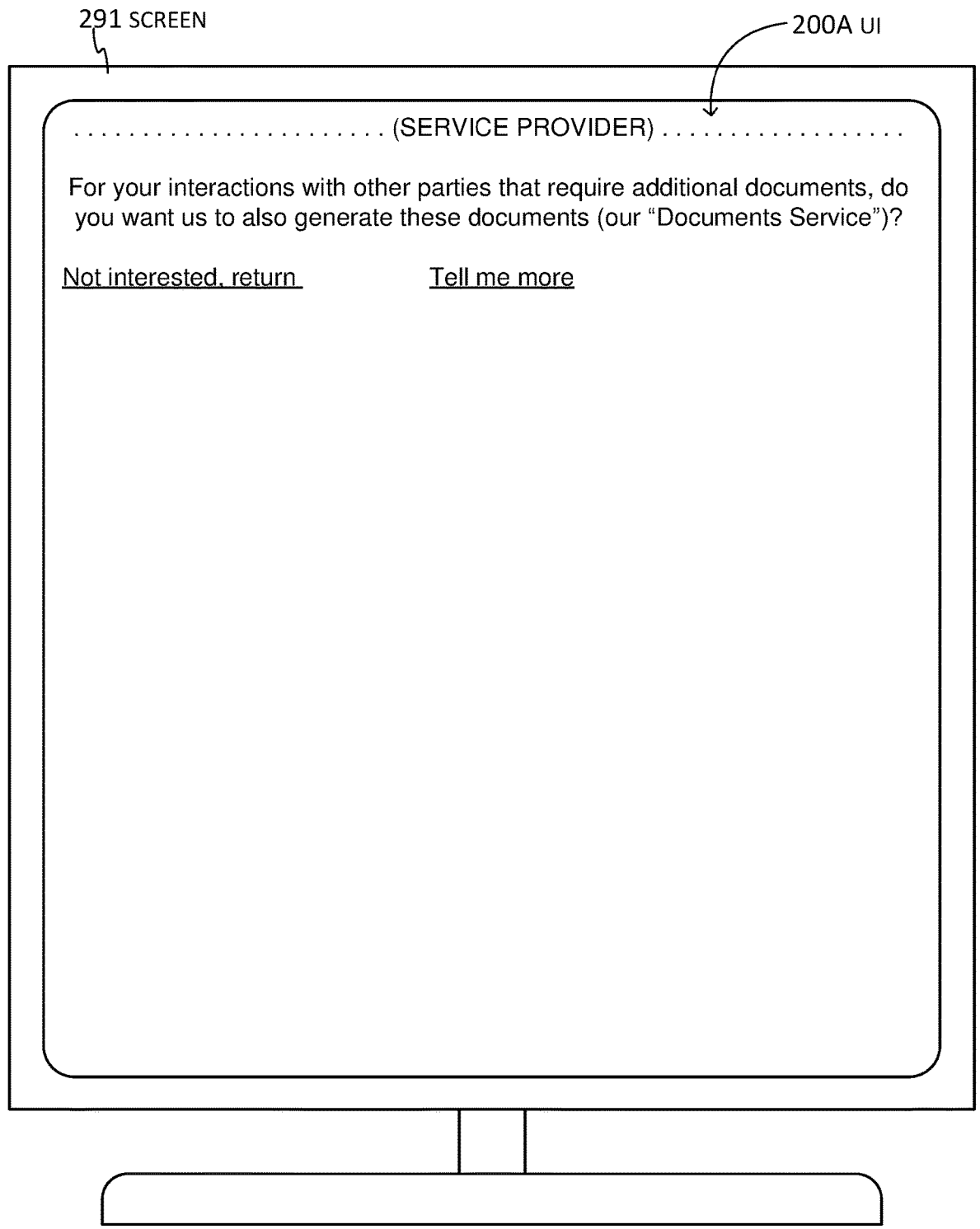
FIG. 2A is a sample view of a User Interface (UI) seen by a user of a primary entity in FIG. 1 in an embodiment during a setup phase.

As has been mentioned, the present description gives instances of computer systems, storage media that may store programs, and methods. Such embodiments are now described in more detail. In a first set of embodiments, an Online Service Provider (OSP) produces resources for relationship instances, prepares digital exhibits that report the resources, stores the digital exhibits, inputs access indicators about them, and sends the access indicators to other parties.

FIG. 1 is a diagram showing sample aspects of embodiments. A thick horizontal line 115 separates this diagram, although not completely or rigorously, into a top portion and a bottom portion. Above the line 115 are shown elements with emphasis mostly on entities, components, their relationships, and their interactions, while below the line 115 are shown elements with emphasis mostly on processing of data that takes place often within one or more of the components that are shown above the line 115.

Above the line 115, a sample computer system 195 according to embodiments is shown. The computer system 195 has one or more processors 194 and a memory 130. The memory 130 stores programs 131 and data 138. The one or more processors 194 and the memory 130 of the computer system 195 thus implement a service engine 183.

Often, for the sake of convenience only, it is preferred to implement and describe a program as various interconnected distinct software modules or features. These, along with data are individually and also collectively known as software. In some instances, software is combined with hardware, in a mix called firmware. Importantly, although the operational and or functional descriptions of this document are understandable by the human mind, they are not abstract ideas of the operations/functions divorced from computational implementation of those operations/functions. Rather, the operations/functions represent a specification for complex computational machines or other means. As discussed in detail elsewhere in this document, each time the operational/functional language must be read in its proper technological context, i.e., as concrete specifications for physical implementations. Far from being understood as an abstract idea, it can be recognized that a functional/operational technical description as a humanly-understandable representation of one or more almost unimaginably complex and time sequenced hardware instantiations.

The computer system 195 can be located in "the cloud." In fact, the computer system 195 may optionally be implemented as part of an Online Software Platform (OSP) 198. The OSP 198 can be configured to perform one or more predefined services, for example via operations of the service engine 183. Such services can be searches, determinations, computations, verifications, notifications, the transmission of specialized information, including data that effectuates payments, the generation and transmission of documents, the online accessing of other systems to effect registrations, and so on, including what is described in this document. Such services can be provided in the form of Software as a Service (SaaS). As such, the OSP 198 can be an online service provider.

A user 192 may be standalone. The user 192 may use a computer system 190 that has a screen 191, on which User Interfaces (UIs) may be shown. In embodiments, the user 192 and the computer system 190 are considered part of a primary entity 193, which could be an organization, an institution, and so on. In such instances, the user 192 can be an agent of the primary entity 193, and even within a physical site of the entity 193, although that is not necessary. In embodiments, the computer system 190 or other device of the user 192 can be client devices for the computer system 195. The user 192 or the primary entity 193 can be clients for the OSP 198. For instance, the user 192 may log into the computer system 195 by using credentials, such as a user name, a password, a token, and so on.

The computer system 190 may access the computer system 195 via a communications network 188, such as the internet. In particular, the entities and associated systems of FIG. 1 may communicate via physical and logical channels of the communications network 188. For example, information may be communicated as data using the Internet Protocol (IP) suite over a packet-switched network such as the Internet or other packet-switched network, which may be included as part of the communications network 188. The communications network 188 may include many different types of computer networks and communication media, including those used by various different physical and logical channels of communication, now known or later developed. Non-limiting media and communication channel examples include one or more, or any operable combination of: fiber optic systems, satellite systems, cable systems, microwave systems, Asynchronous Transfer Mode ("ATM") systems, frame relay systems, Digital Subscriber Line ("DSL") systems, Radio Frequency ("RF") systems, telephone systems, cellular systems, other wireless systems, and the Internet. In various embodiments the communications network 188 can be or include any type of network, such as a Local Area Network (LAN), a Metropolitan Area Network (MAN), a Wide Area Network (WAN), or the internet. Accordingly, from certain perspectives, the OSP 198 is in the cloud.

Accessing, downloading and/or uploading, and so on may be permitted among these computer systems. Such can be performed, for instance, with manually uploading files, like spreadsheet files, etc. Such can also be performed automatically as shown in the example of FIG. 1, with systems exchanging requests and responses.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In embodiments, the user 192 and/or the primary entity 193 have instances of relationships with secondary entities. Only one such secondary entity 196 is shown. The secondary entity 196 can be an organization, a person, and so on. In some embodiments, the secondary entity 196 has a device 132, which can be an electronic device such as a cellphone, tablet, laptop, computer system and so on. The device 132 may have a screen 133. In this example, the primary entity 193 has a relationship instance 197 with the secondary entity 196. In fact, the secondary entity 196 may have used a device such as the device 132 to create the relationship instance 197. The primary entity 193 and/or the secondary entity 196 may be referred to as simply entities.

The primary entity 193 and/or the secondary entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, a specific domain that the entity belongs in a context of multiple domains that are defined in terms of the above, and so on.

The primary entity 193 and/or the secondary entities may be associated with respective domains. One such domain may encompass or be associated with one or more such entities, for instance according to rules for belonging in a domain. Domains may have their own rules or requirements for entities that they encompass, are associated with them, or belong to them. A plurality 160 of domains 161, 162, 163, . . . is shown in FIG. 1. At least one of the primary entity 193 and the secondary entity 196 may be associated with a certain domain of the plurality 160 of domains, the association possibly based on the relationship instance 197. In the example of FIG. 1, the certain domain is domain 162, which has an emerging dashed arrow that does not terminate, to indicate that the dashed arrow could point to either the primary entity 193 or the secondary entity 196.

As mentioned above, the computer system 190 may access the computer system 195. A first such access could be for set up reasons, before the relationship instance 197 is ever formed.

Figure 2C:
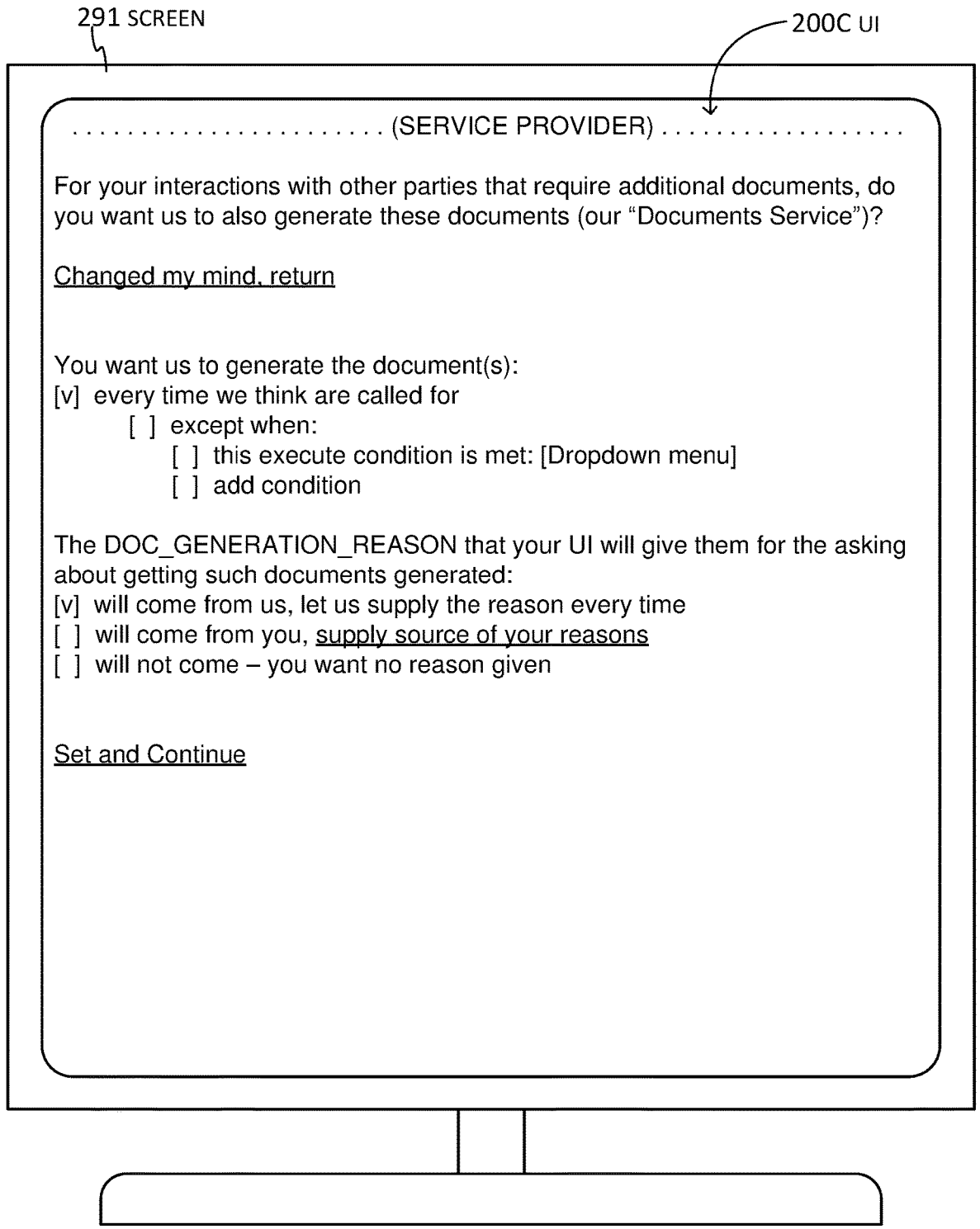
FIG. 2C is a sample view of a User Interface (UI) that could follow the UI of FIG. 2B, in an embodiment during a setup phase.

FIG. 2A is a sample view of a User Interface (UI) 200A, shown on a screen 291. The screen 291 could be the screen 191 of the primary entity 193, seen by the user 192. By its own words, the sample UI 200A provides, for the benefit of the primary entity 193, the option that the OSP to prepare digital exhibits in the forms of documents associated with and/or pertaining to relationship instances, such as the relationship instance 197. In the UI 200A, the user 192 may click on the underlined link: "Not interested, return", and not enable the option. If, during the setup phase, the user 192 clicks on the link: "Tell me more", they may get another UI, for instance:

FIG. 2B is a sample view of a User Interface (UI) 200B that could follow the UI 200A. Explanations and options are provided, along with a beginning box 277 for what could be shown to the screen 133 of the secondary entity 196, when the relationship instance 197 is being formed. If, during the setup phase, the user 192 clicks on the link: "Click here to enable this feature, set for which of your items, and set the extra charge.", they may get another UI, for instance:

FIG. 2C is a sample view of a User Interface (UI) 200C that could follow the UI 200B. The 200C provides sample options for when the beginning box 277 should appear, what it might say, and so on.

Of course, FIGS. 2A, 2B and 2C show examples of setup, which can be made according to the capabilities of the OSP 198. Setup data with the inputs of the user 192 can be stored in the computer system 195 for the benefit of the primary entity 193.

Figure 3:
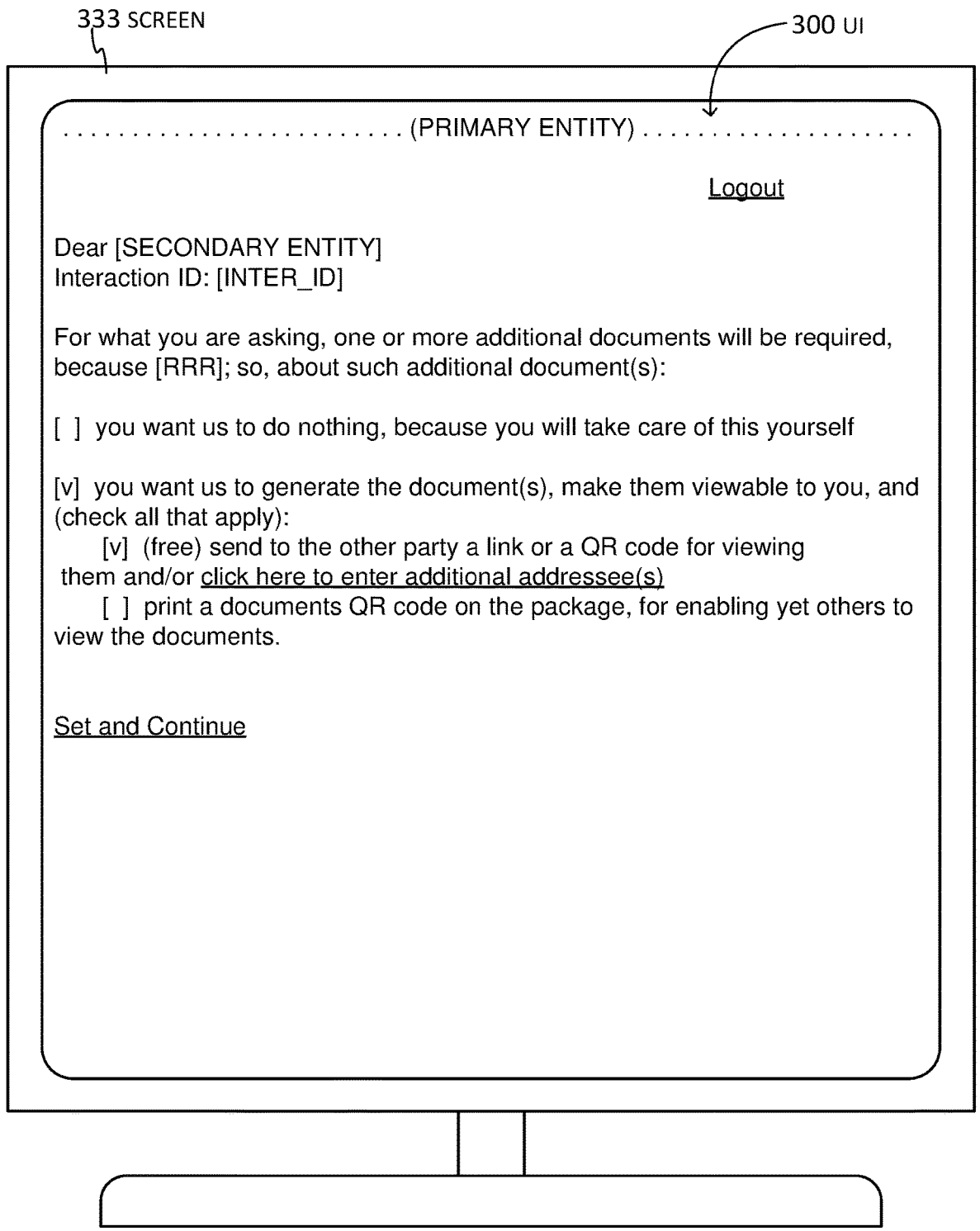
FIG. 3 is a sample view of a User Interface (UI) seen on a screen of a secondary entity of FIG. 1 in an embodiment, in response to the secondary entity attempting to form a relationship instance with a primary entity, and in response to selections made in the UIs of FIG. 2B and of FIG. 2C.

Returning to FIG. 1, in some instances, the user 192 and/or the primary entity 193 obtain data about one or more secondary entities, for example as necessary for conducting the relationship instances with them. The obtained data can be about attributes of the entities, or of the relationship instances. Obtaining the data or the relationship instance may be initiated, for instance, by the secondary entity 196. For example, the computer system 195 may receive, via a communications network, a first communication 141. The first communication 141 may be received by the computer system 195 from a device 132 of the secondary entity 196. As mentioned above, the device 132 is distinct from the computer system 195. The first communication 141 may include data about a prospective relationship instance, or about the relationship instance 197. A number of responses can be planned for the first communication 141, for instance:

FIG. 3 is a sample view of a User Interface (UI) 300 seen on a screen 333, which could be the screen 133 of the secondary entity 196. The UI 300 may appear in response to the secondary entity 196 attempting to form a relationship instance, before or after the resource production that is described later in this document. For instance, the UI 300 may appear in response to the first communication 141 being received.

It will be recognized that the UI 300 would appear based on selections made during the setup phase. Indeed, the UI 300 appears in the first place thanks to the feature being enabled in FIG. 2B, and in fact most of its verbiage is that of the beginning box 277. In addition, it mentions a reason, which is depicted with the variable "RRR", and whose sourcing was chosen by the primary entity 193 in the UI of FIG. 2C, and was mentioned as the variable "DOC_GENERATION_REASON" in the UI of FIG. 2B.

Returning to FIG. 1, much of this description proceeds for embodiments where a digital exhibit 151 will be prepared, whether automatically or after conditions are met, for instance the primary entity 193 making the option available, per FIGS. 2A, 2B, 2C, the secondary entity 196 choosing the option as per FIG. 3, and so on.

In embodiments, in furtherance of the relationship instance 197, the computer system 190 transmits, via a communications network such as the communications network 188 and responsive to receiving the first communication 141, a second communication to a service engine of an Online Service Provider (OSP). For instance, it can be the service engine 183 of the OSP 198, which is distinct from the computer system 190. The second communication may include a dataset that has parameters which can also be called dataset parameters. At least some of the dataset parameters respective values that can also be called dataset values. The dataset values can be about the relationship instance 197. At least one of the dataset parameters is a domain dataset parameter that has a domain dataset value that characterizes the certain domain 162. This second communication can be programmed to cause the service engine 183 to perform operations that are now described.

As such, the computer system 195 receives one or more datasets. A sample received dataset 135 is shown below the line 115. The dataset 135 may be received by the computer system 195 in a number of ways. In some embodiments, one or more requests may be received by the computer system 195 via a network. In this example, a request 184 is received by the computer system 195 via the communications network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset 135. In this example the single payload 134 encodes the entire dataset 135, but that is not required. In fact, a dataset can be received from the payloads of multiple requests. In such cases, a single payload may encode only a portion of the dataset. And, of course, the payload of a single request may encode multiple datasets. Additional computers may be involved with the communications network 188, some beyond the control of the user 192 or of the OSP 198, and some within such control.

In embodiments, the dataset values of the dataset 135 are numerical, alphanumeric, Boolean, and so on, as needed for what the parameters characterize. For example, the value of an identity parameter ID may indicate an identity of the dataset 135, so as to differentiate it from other such datasets. At least one of the dataset values may characterize an attribute of a certain one of the entities 193 and 196, as indicated by correspondence arrows 199. For instance, a parameter D1 may have the value of a name of the certain entity, a parameter D2 may have a value of relevant data of the entity, and so on. Plus, an optional dataset parameter B1 may have a numerical base value. The base value B1 can be for an aspect of the dataset, and so on. The aspect of the dataset may be the aspect of a value that characterizes the attribute, an aspect of the reason that the dataset was created in the first place, an aspect of the relationship instance 197, and so on. The dataset 135 may further have additional dataset parameters, as indicated by the horizontal dot-dot-dot in the right side of the dataset 135. In embodiments, the dataset values characterize attributes of both the primary entity 193 and the secondary entity 196, but that is not required.

As mentioned above, at least one of these dataset parameters is a domain dataset parameter that has a domain dataset value that characterizes the certain domain 162. The domain dataset parameter may include, for example, a geographic address, if domains are conceived geographically. Or, the domain dataset parameter can be an explicit dataset parameter.

In embodiments, the domain dataset parameter can be parsed by the computer system 195 to identify the certain domain 162. For instance, if the domain dataset value is a geographic address, it can be parsed to identify its city, state, region, country, and so on.

In embodiments, a plurality of stored file templates may be accessed by the computer system 195. In embodiments, these file templates can be digital documents that can support text, extensible markup language (XML) files, and so on. A markup language is a set of codes, or tags, that describes text in a digital document. The most famous markup language is hypertext markup language (HTML), which is used to format Web pages. An XML template can be simply an XML file that specifies an ordered list of variables to be stored.

The stored file templates may mention one or more requirements. The requirements can be requirements for parameter values. In embodiments, one or more of the requirements can be answered by one of the dataset values. At least some of the stored file templates can be associated with respective ones of domains in a plurality of domains. In the example of FIG. 1, a plurality 110 of stored file templates are accessed. This plurality 110 includes File Template A 111, File Template B 112, File Template C 113, . . . . At least some of these are associated respectively with the domains 161, 162, 163 in the plurality 160 of domains. For instance, the File Template B 112 is associated with the certain domain 162, as indicated by an arrow pointing to the domain 162. Further in the example of FIG. 1, the File Template B 112 mentions a Requirement A 121, a Requirement B 122, and a Requirement C 123.

In embodiments, one of the stored file templates that is related to the certain domain may be selected by the computer system, responsive to at least the domain dataset value. These file templates can be digital documents that can support text, XML files, and so on. In the example of FIG. 1, the File Template B 112, which is related to the certain domain 162 as shown by an arrow, is selected by the computer system 195, responsive to at least the domain dataset value that has been parsed as per the above.

This selection, or selecting, may be performed in a number of ways. In some embodiments, a plurality 168 of stored template rules can be accessed by the computer system 195. In such embodiments, the selecting of the one of the stored file templates can be performed by applying the domain dataset value to the plurality of stored template rules. For instance, the file templates may include the name of a domain they apply to, whether in the filename, or within them. Even for a single domain, there may be multiple file templates to further select from, and that further selection may be performed from the domain dataset value or other dataset values.

In embodiments, one of the requirements mentioned in the selected file template may be identified by the computer system. In the example of FIG. 1, the Requirement A 121 is identified by the computer system 195.

In embodiments, digital resource rules 170 are provided for use by the OSP 198. In the example of this diagram, only one sample digital resource rule is shown explicitly, namely rule D_R_RULE4 174, while other such rules are indicated by the vertical dot-dot-dots. These rules 170 are digital in that they are implemented for use by software. For example, these rules 170 may be implemented within the programs 131 and/or the data 138. The data portion of these rules 170 may alternately be stored in memories, local or in other places that can be accessed by the computer system 195. The storing can be in the form of a spreadsheet, a database, etc.

In embodiments, the computer system 195 may access the stored digital resource rules 170. This accessing may be performed responsive to the computer system 195 receiving one or more datasets, such as the dataset 135.

Then the computer system 195 may select a certain one of the accessed digital resource rules 170. In this example, the rule D_R_RULE4 174 is thus selected as the certain digital resource rule. The computer system 195 may thus select the certain rule D_R_RULE4 174 responsive to one or more of the dataset values of the dataset parameters of the dataset 135, as per the arrows 171. The selection of this particular rule is indicated also by the fact that an arrow 178 begins from that rule. The arrow 178 is described in more detail later in this document.

Then the computer system 195 may produce a resource for the dataset 135, such as the resource 179. The produced resource is for the requirement identified as above. In the example of FIG. 1, the produced resource 179 is for the identified Requirement A 121.

The computer system 195 may thus produce the resource by applying the certain digital resource rule, which was previously selected, responsive to at least one of the dataset values of the dataset parameters of the dataset 135. In the example of FIG. 1, the resource 179 is produced for the dataset 135 by the computer system 195 applying the certain digital resource rule D_R_RULE4 174, as indicated by the arrow 178. The impact of the dataset 135 in producing the resource 179 is indicated by at least one of the arrows 171.

The produced resource can be a determination, a computational result, etc., made, created or prepared for the user 192, and/or the primary entity 193, and/or the secondary entity 196, etc. As such, in some embodiments, the resource is produced by processing and/or a computation. In some embodiments, therefore, the resource is produced on the basis of a characterized attribute of the primary entity 193 and/or the secondary entity 196.

The resource may be produced in a number of ways. For instance, at least one of the dataset values can be a numerical base value, e.g. B1, as mentioned above. In such cases, applying the certain digital resource rule may include performing a mathematical operation on the base value B1. For example, applying the certain digital resource rule may include multiplying the numerical base value B1 with a number indicated by the certain digital resource rule. Examples of small such numbers include 0.015, 0.03, 0.05, and so on, but the numbers need not be small or only positive. Such a number can be indicated directly by the certain rule, or be stored in a place indicated by the certain rule, or by the dataset 135, and so on.

In some embodiments two or more digital main rules may be applied to produce the resource. For example, the computer system 195 may select, responsive to one or more of the dataset values, another one of the accessed digital resource rules 170. These one or more dataset values can be the same as, or different than, the one or more dataset values responsive to which the first selected rule was selected. In such embodiments, the resource can be produced by the computer system 195 also applying the other selected digital resource rule to at least one of the dataset values. For instance, where the base value B1 is used, applying the first selected rule may include multiplying the numerical base value B1 with a first number indicated by the first selected rule, so as to compute a first product. In addition, applying the second selected rule may include multiplying the numerical base value B1 with a second number indicated by the second selected rule, so as to compute a second product. And, a value of the resource may be produced by summing the first product and the second product. Examples are now described in more detail.

The digital resource rules 170 include the rule D_R_RULE4 174 that is eventually selected and applied. In some embodiments, the rules 170 are implemented by simple rules. A simple rule has a single condition ("P"), and a single consequent ("Q"). As a result of an initial search, then, the digital resource rule D_R_RULE4 174 is selected, and then its consequent is applied to produce the resource.

In some embodiments, the rules 170 further include additional digital resource rules that select that digital resource rule D_R_RULE4 174 in the first place, for ultimately applying it. In such embodiments, the rules 170 can be implemented as simple rules or as complex rules. Complex rules may have more than one conditions, and/or more than one consequents. Complex rules may be implemented as individual single rules with complex coding. Alternatively, a complex rule may be implemented in part by more than one simpler individual rules, which can have hierarchical relationships among them, e.g. from one rule's application or execution leading to another, and so on. As a result of the initial search, then, rules are found which, when applied, select that certain rule in the first place.

Figure 4:
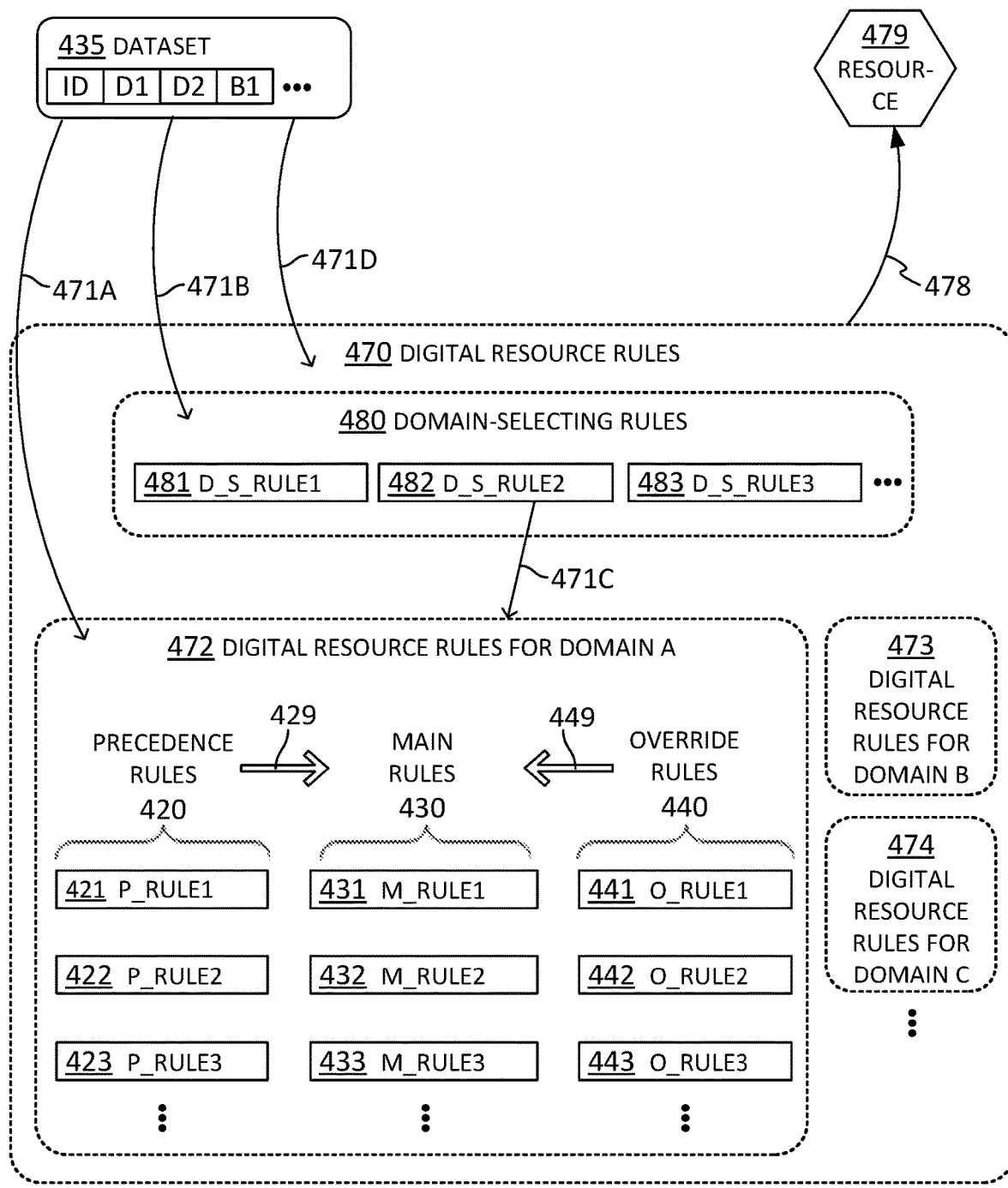
FIG. 4 is a diagram showing details and aspects of different types of possible embodiments of the digital resource rules of FIG. 1, which are improvements in automated computerized systems.

In particular, and referring to FIG. 4, a dataset 435 can be as described for the dataset 135 of FIG. 1. In addition, a set 470 of digital resource rules is an example of digital resource rules, such as the digital resource rules 170 of FIG. 1.

Similarly with FIG. 1, in FIG. 4 a resource 479 can be produced according to an arrow 478. The resource 479 can be as the resource 179, at least an aspect of which can be reported by the notification 136, and so on.

The set 470 of digital resource rules includes different subsets, into which the individual rules belong. In addition, there can be hierarchical relationships among rules of different subsets, and/or of types. Often only one of these individual rules is eventually selected and applied, while one or more of them may have been used for selecting it. The certain rule that is eventually selected can be a rule in any one of subsets of the set 470 of digital resource rules, and none is shown as such in the example of FIG. 4.

In the example of FIG. 4, the set 470 includes a subset 480 of domain-selecting rules. The set 470 also includes subsets 472, 473, 474, . . . , each for digital resource rules for sample domains A, B, C, . . . respectively. A domain for which a subset of resource rules is thus provided could be associated with the primary entity 193 of FIG. 1, another domain could be associated with the secondary entity 196, and so on.

In many embodiments, one of the domain-selecting rules of the subset 480 can be used to select which domain's rules should be applied. Then the certain one of the digital resource rule(s) can be selected from the digital resource rules of the selected domain. Then the resource 479 can be produced by applying the selected certain digital resource rule(s) to at least one of the dataset values of the dataset parameters of the dataset 435.

In this example, the subset 480 of domain-selecting rules includes rules D_S_RULE1 481, D_S_RULE2 482, D_S_RULE3 483, . . . . One of these rules may be selected and used when more than one domain could be considered as eligible for its rules to apply. The rules of the subset 480, however, might not be necessary for embodiments where a single domain is considered or implied for one or more, or all of, the relationship instances. This can happen, for example, when it is known in advance that the primary entity 193 and every possible secondary entity are both associated with the same domain. Or, when it is planned that digital resource rules of only one domain will be considered, while any rules of any other domain will not be considered and will be disregarded.

Resource rules for individual domains are now described. Such rules need not be the same for each domain, or of the same type for each domain. The sample subset 472 of resource rules for domain A is now described in more detail. Its description can be similar for subsets for other domains, such as the subsets 473, 474, . . . .

The subset 472 of resource rules includes different types of rules. In this example, the subset 472 includes precedence rules 420, main rules 430, and override rules 440. In this example, the precedence rules 420 include rules P_RULE1 421, P_RULE2 422, P_RULE3 423, . . . . The main rules 430 include rules M_RULE1 431, M_RULE2 432, M_RULE3 433, . . . . The override rules 440 include rules O_RULE1 441, O_RULE2 442, O_RULE3 443, . . . .

In embodiments, one of the main rules 430 may ordinarily be selected as the certain digital resource rule, which in FIG. 1 is shown as rule D_R_RULE4 174. In other words, the certain digital resource rule could be, say, the main rule M_RULE2 432.

In this example, although not always required, the different types of rules within the subset 472 further have different hierarchies among them.

For a first instance, one of the precedence rules 420 may indicate which one of the main rules 430 is to be selected, as generally indicated by an arrow 429. Or, the one of the precedence rules 420 that does apply may itself be the eventually selected certain digital resource rule, instead of indicating any one of the main rules 430.

For a second instance, even when one of the main rules 430 is thus indicated, one of the override rules 440 may still override the indication, as generally indicated by an arrow 449. In such cases, the one of the rules 440 that overrides may be the eventually selected certain digital resource rule, instead of one of the main rules 430. Or, one of the rules 440 overrides by indicating yet a different one of the main rules 430 to be selected instead, and so on.

In FIG. 4, sample arrows 471A, 471B and 471D begin from the dataset 435. These arrows suggest possible paths of the eventual selection of the certain rule, for ultimately producing the resource 479. These arrows are more detailed versions of the arrows 171 of FIG. 1. They are examples of possible arrows, and not all of them are necessarily used in every such determination.

According to the arrow 471A, the subset 472 is indicated. So, at least one of the rules of the subset 472 may initially be indicated as the certain rule, e.g. from one or more values of the parameters of the dataset 435. The initially indicated rule can be the finally certain rule, or another intermediate rule which, in turn, will be used to select that certain rule.

According to the arrow 471B, at least one of the domain-selecting rules of the subset 480 may be invoked, from one or more values of the parameters of the dataset 435.

According to an arrow 471C, the one of the rules of subset 480 that was invoked by the arrow 471B was the rule D_S_RULE2 482. And, the arrow 471C further indicates that the invoked rule points to the subset 472, instead of to the subsets 473, 474, . . . . As such, the subset 472 of resource rules should be used for selecting the certain rule. This example has the same result, but from a different path, as the sample arrow 471A.

The arrow 471D is drawn to indicate that one or more of the values of the parameters of the dataset 435 are received and processed by the finally selected certain rule, for producing the resource 479.

Any one of the above-described sets of rules may be searched iteratively. An example is now described.

Figure 5:
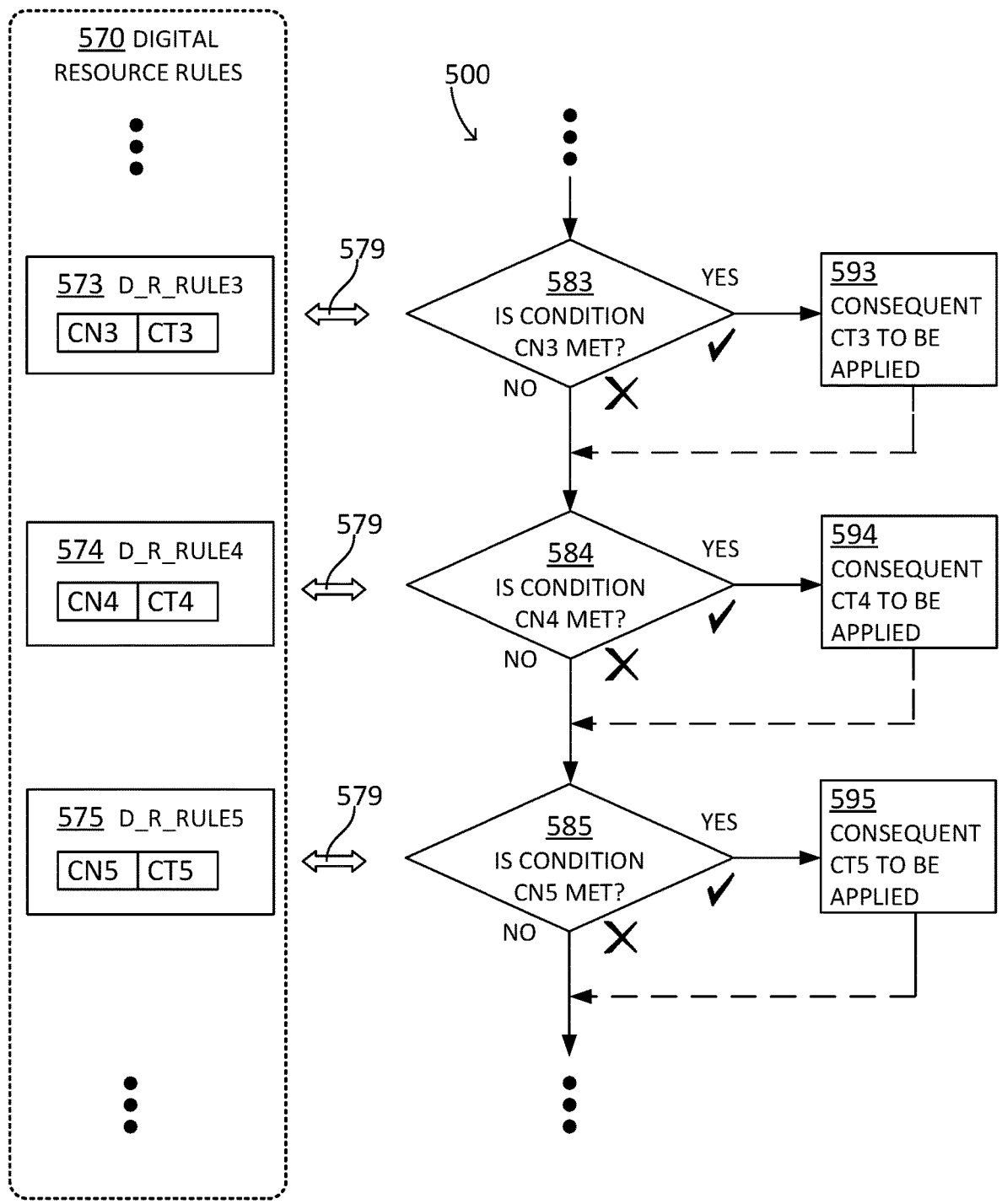
FIG. 5 is a diagram that shows sample digital resource rules such as those of FIG. 1 and/or of FIG. 4, and juxtaposes them with decision boxes of a flowchart portion of a sample method for recognizing that conditions of a certain digital resource rule can be met for its consequent to be applied, all according to embodiments of the present disclosure, which is an improvement in automated computerized systems.

Referring now also to FIG. 5, digital resource rules 570 are shown, which can be as the digital resource rules 170 or of the set 470. The digital resource rules 570 include the shown D_R_RULE3 573, D_R_RULE4 574 and D_R_RULE5 575, plus others according to the dot-dot-dots. In embodiments, some of the digital resource rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital resource rules include respective conditions and respective consequents that are associated with the respective conditions. And, for a certain digital main rule, if its certain condition P is met, then its certain consequent Q is what happens or becomes applied. In this example, the digital resource rules D_R_RULE3 573, D_R_RULE4 574, and D_R_RULE5 575, include respective conditions CN3, CN4, CN5. They also include consequents CT3, CT4, CT5 that are associated with the respective conditions CN3, CN4, CN5, respectively.

In addition, FIG. 5 shows a flowchart portion 500. In particular, individual ones of the digital resource rules 570 are shown juxtaposed with individual ones of respective decision operations of the flowchart portion 500, according to two-way juxtaposition arrows 579.

In embodiments, therefore, the operation of identifying an applicable digital rule is performed by recognizing, by the computer system 195, that a certain condition of a certain one of the accessed digital resource rules is met by one or more of the values of the parameters of the dataset. An example of such an operation is shown by the flowchart portion 500. In particular, according to successive decision operations 583, 584, 585, it is determined whether or not conditions CN3, CN4, CN5 are met by at least one of the values of a parameter of the dataset, respectively. If the answer to all is NO, then execution may proceed to the next decision operation. If the answer is YES then, according to operations 593, 594, 595, it is further determined that the respective consequents CT3, CT4, CT5 are to be applied. A consequent that is to be applied could be, for example, flagged as TRUE, executed on the spot, and so on. Then execution may proceed to the next decision operation in the flowchart portion 500 as is shown, or exit from it.

From what was mentioned in connection with FIG. 1, the certain D_R_RULE4 574 was thus identified. With reference to FIG. 5, the identification may have happened at the operation 584, at which time it was recognized that condition CN4 was met by a value of a parameter of the dataset 135. This made: the condition CN4 be the certain condition, the digital main rule D_R_RULE4 574 be the certain digital main rule, and the consequent CT4 be the certain consequent. Therefore, according to operation 594, the consequent CT4 is what happens or becomes applied, as part of applying the rule.

A number of examples are possible for how to recognize that a certain condition of a certain digital rule is met by at least one of the values of a parameter of the dataset. For instance, the certain condition could define a boundary of a region that is within a space. The region could be geometric, and even be within a larger space. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the parameters of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

Returning to FIG. 1, in embodiments, a digital exhibit is prepared by the computer system and from the selected file template. The digital exhibit may be a suitable computer file. In the example of FIG. 1, a digital exhibit 151 is prepared by the computer system 195 and from the selected File Template B 112.

In embodiments, the prepared digital exhibit is stored in a storage location. The storage location is of course a memory. In the example of FIG. 1, the digital exhibit 151 is shown drawn directly within a storage location 152.

In some embodiments, the storage location is in a memory of the computer system which, as also mentioned elsewhere, can be a non-transitory computer-readable storage medium. In the example of FIG. 1, the storage location 152 is in the memory 130, for instance as part of the data 138. But it need not be so: in other embodiments, the storage location 152 is not part of the service engine 183, or of the computer system 195, or even of the OSP 198.

In some embodiments, the digital exhibit is prepared directly in the storage location. In other embodiments, an additional operation is to store by the computer system, the digital exhibit in the storage location after it has been prepared.

In embodiments, the digital exhibit may report entries for requirements of the selected file template, as answering these requirements. In the example of FIG. 1, the digital exhibit 151 is arranged to report entries 176, 177 as answering the Requirement B 122 and the Requirement C 123. The entries 176, 177 may be provided from values of the dataset 135, from known values about the primary entity 193, and so on.

In embodiments, the digital exhibit can be arranged to report the resource. In the example of FIG. 1, the digital exhibit 151 is arranged to report the resource 179, which is why the resource 179 is shown as part of the digital exhibit 151 in the first place.

In embodiments, the digital exhibit can be arranged to report the resource as answering, being the answer to, the identified requirement. In the example of FIG. 1, the identified Requirement A 121 is repeated in a second instance as a requirement 1216 within the digital exhibit 151, and the digital exhibit 151 itself is arranged to report the resource 179 as answering the requirement 1216.

In embodiments, the digital exhibit is arranged to report the resource by presenting the identified requirement at a first location of the digital exhibit, and by presenting the resource at a second location of the digital exhibit that is next to or below the first location. An example is now described.

Figure 6:
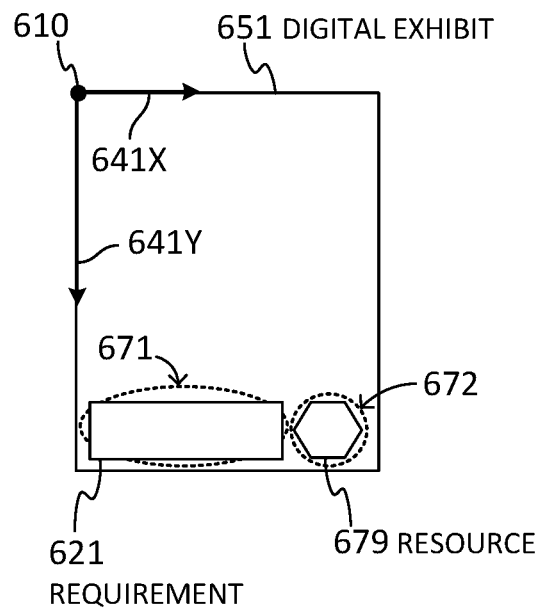
FIG. 6 is a diagram showing a sample digital exhibit according embodiments.

Referring now to FIG. 6, a digital exhibit 651 reports a requirement 621, which can be as the identified Requirement A 121. The digital exhibit 651 also reports a resource 679, which can be as the resource 179. The resource 679 is reported as answering the requirement 621. In particular, the requirement 621 is presented at a first location 671 of the digital exhibit 651, and the resource 679 is presented at a second location 672 of the digital exhibit 651. The second location 672 is next to the first location 671.

The first location 671 and the second location 672 can be described in terms of a cartesian x-y coordinate system. In the example of FIG. 6, these can be chosen for convenience as follows: an origin point 610 is chosen at the top left of the digital exhibit 651, an x dimension is measured according to a horizontal arrow 641X that points to the right of the origin point 610, and a y dimension is measured according to a vertical arrow 641Y that points downwards from the origin point 610. In embodiments where the digital exhibit 651 is made to look like a page of a document, the vertical arrow 641Y can define how far down a location is from the document and the horizontal arrow 641X can define how far to the right in the line a location is.

In some embodiments, the file template presents a location for the resource to be placed. This could be, for example, when the file template is a form-fillable pdf, an xml file, and so on, with types of documents that indicate where resources can be placed as answering previously presented words.

Figure 7:
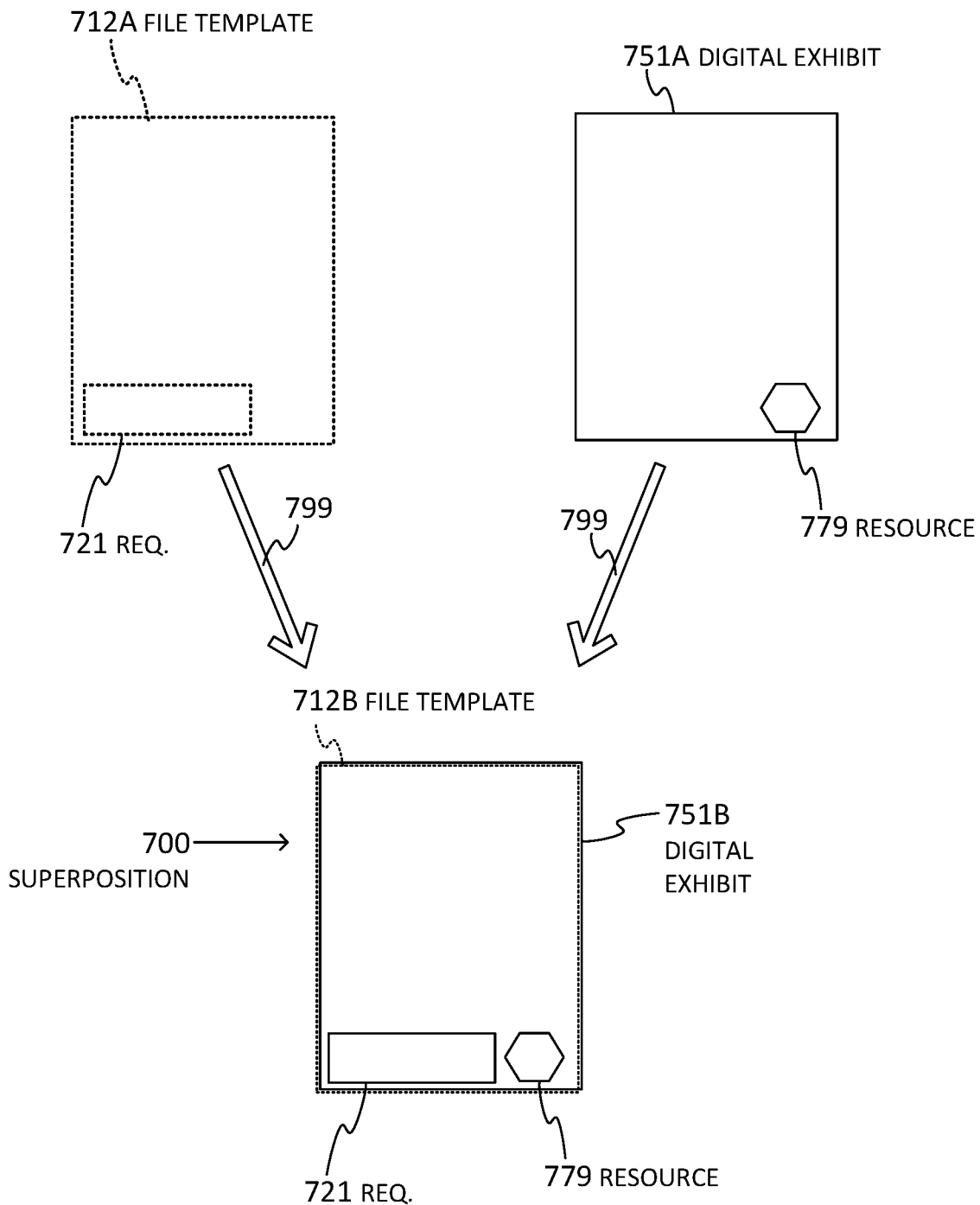
FIG. 7 is a diagram showing how a sample digital exhibit can be prepared to be viewable in superposition with a file template according to embodiments.

Referring now to FIG. 7, in some embodiments, the digital exhibit is prepared to be viewable in superposition with a file template. For instance, the file template may present the identified requirement at a certain location of the file template, and the digital exhibit may present the resource at a particular location of the digital exhibit. In such embodiments, the digital exhibit can be configured to be viewable in superposition with the file template such that the resource is viewable as answering the identified requirement. The certain location and the particular location can be defined in a suitable way, for instance with respect to a coordinate system, such as that shown in FIG. 6. The viewing can be on a screen, as part of a UI. The superposition can be effectuated in a number of ways. For instance, the items can be as objects in a drawings software, for instance the Visio® software.

In the example of FIG. 7, at the top left, a first instance 712A of a file template is shown. The first instance 712A presents a requirement 721 at a certain location of the file template. The requirement 721 can be as the identified Requirement A 121. In addition, at the top right, a first instance 751A of a digital exhibit is shown. The first instance 751A presents a resource 779 at a particular location of the digital exhibit. The resource 779 can be as the resource 179. In this example, the first instance 712A of the file template is identical in shape to the first instance 751A of the digital exhibit, although that is not necessary.

In the example of FIG. 7, at the bottom, a second instance 712B of the file template is shown, which is identical to its first instance 712A. The second instance 712B repeats the requirement 721. In addition a second instance 751B of the digital exhibit is shown, which is identical to its first instance 751A. The second instance 751B repeats the resource 779. The second instance 712B and the second instance 751B have been created by replicating arrows 799.

A superposition 700 is therefore created by the second instance 712B and the second instance 751B. It will be observed that the repeated resource 779 is arranged to be reported as answering the repeated requirement 721. It should be noted, however, that the superposition 700 is what is visible to a user, while the two items remain separate.

In this example, the superposition is exact, because the file template is identical in shape to the digital exhibit, which has the benefit of simplicity in creating the superposition 700. If they are not identical in shape, then the superposition can be guided by defining reference points, such as the point of origin 610 of FIG. 6, and aligning by making the reference points coincide.

In some embodiments, the digital exhibit is prepared by creating a copy of the selected file template, and then adding the resource to the copy of the selected file template. The addition could be, for example, by first aligning, such as was described with reference to FIG. 7.

Returning again to FIG. 1, in embodiments, the digital exhibit is prepared by the computer system as perceived by the primary entity and by the secondary entity. This does not prevent, however, the computer system to prepare the digital exhibit with assistance by an external party that is distinct from the primary entity and from the secondary entity. The assistance can be, for example, in indicating which template should be used, in supplying the template, in preparing the entire digital exhibit, any combination of the above, and so on. An example is now described.

Figure 8:
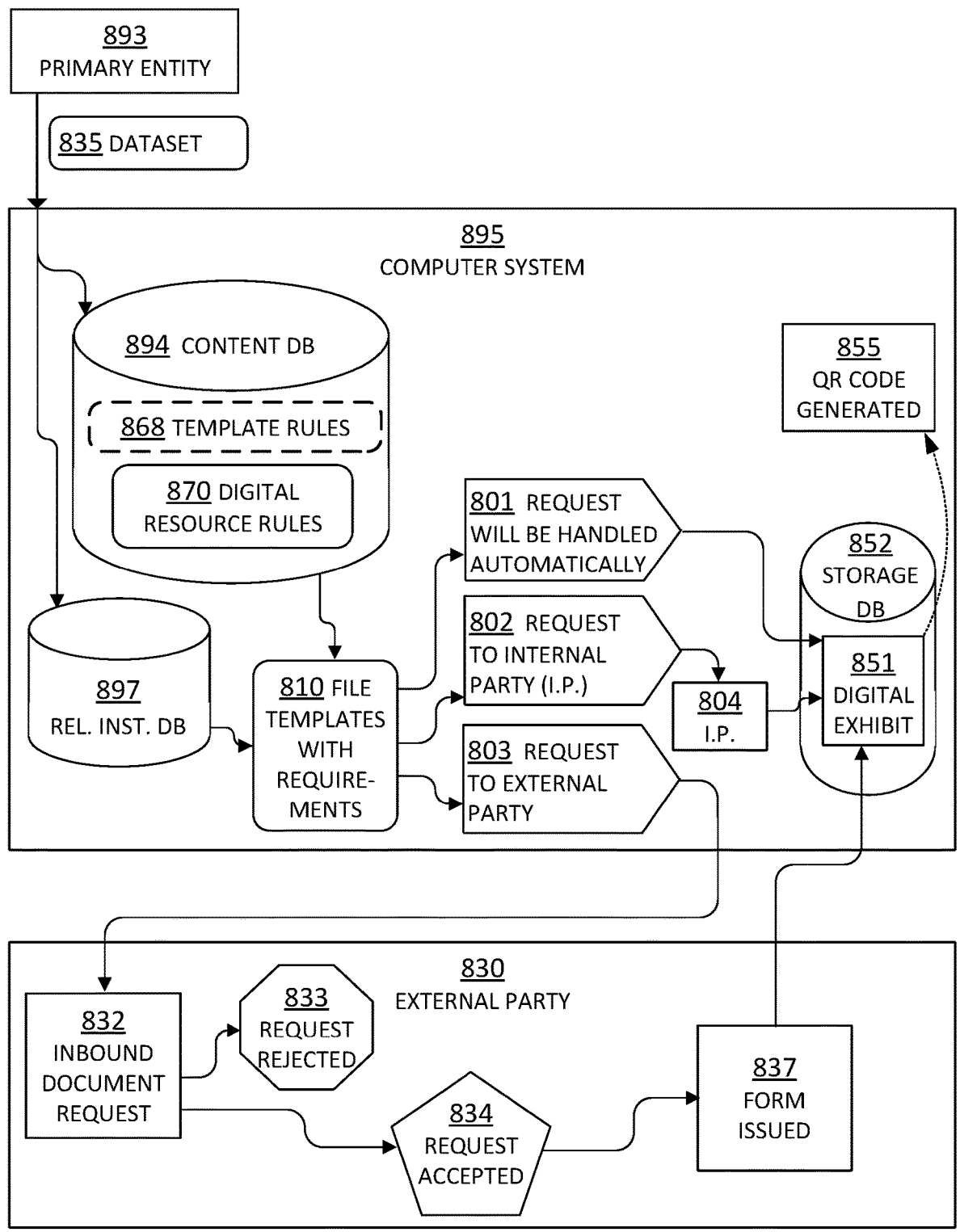
FIG. 8 is a diagram of sample components for an OSP of FIG. 1 to prepare a digital exhibit according to embodiments.

Referring now to FIG. 8, a primary entity 893 sends a dataset 835 to a computer system 895, all of which can be similar to elements described with reference to FIG. 1. The computer system 895 will use the assistance of an external party 830. The external party 830 distinct from the primary entity 893 and from the secondary entity (not shown in FIG. 8). In this example, workflows can be performed by computers except when mentioned otherwise.

As seen in FIG. 8, the computer system 895 includes a content database 894, which stores digital rules 870, and optionally also template rules 868. The dataset 835 is received and stored by the content database 894.

The computer system 895 may also maintain a relationship instances database 897 for other reasons. The relationship instances database 897 may also receive and store the dataset 835.

A set 810 of file templates is addressed by the content database 894, after the content database 894 has received the dataset 835. In some embodiments, elements of the dataset 835 are brought to the set 810 from the relationship instances database 897. Then a determination is made as to whether a subsequent operation will be (801) to handle the request internally and automatically, or (802) to handle the request by an internal party, or (803) to transfer the request to an external party, such as the external party 830. Any one of these operations may result in a digital exhibit 851 being prepared, and stored in a storage database 852. After that, a QR (Quick Response) code 855 may be generated, as described later in this document.

The operation 801 may be performed where a copy of a template, such as a form, is received from which the digital exhibit 851 is prepared. Preparing may involve filling in the form with dataset values from the dataset 835, a produced resource, and so on.

The operation 802 may result in the request being handled by an internal party (I.P.) 804 which, in some workflows, may involve a human.

The operation 803 creates an inbound document request 832 for the external party 830. In this example, the external party 830 has features for detecting when to reject a request for inadequacy, invalidity, or being out of scope. This may result in the inbound document request 832 to be rejected (833), without being fulfilled. If not, the inbound document request 832 may be accepted (834), and result in an operation 837 where the form is issued. Then the form can be stored in the storage database 852 as the digital exhibit 851.

Returning to FIG. 1, in some embodiments, an access indicator is input by the computer system. In the example of FIG. 1, an access indicator 155 is shown, which is input by the computer system 195.

The access indicator may be adapted to facilitate viewing the digital exhibit, when the digital exhibit is stored in the storage location. In the example of FIG. 1, the facilitation of the viewing is generally indicated by a reference arrow 117.

In some embodiments, the access indicator is input after it has been generated by a module outside the computer system. But in other embodiments, operations include generating, by the computer system, the access indicator. In such embodiments, the inputted access indicator is the generated access indicator.

Figure 9:
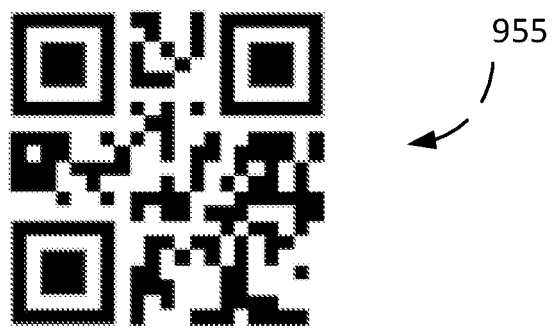
FIG. 9 is a diagram of a sample access indicator that includes a QR code.

Referring now to FIG. 9, in some embodiments the access indicator includes a QR (Quick Response) code. In the example of FIG. 9, a sample QR code 955 is shown. A QR code is a machine-readable code, which is readable by a camera and interpretable by a processor.

Examples are now provided for the facilitation of viewing.

Figure 10:
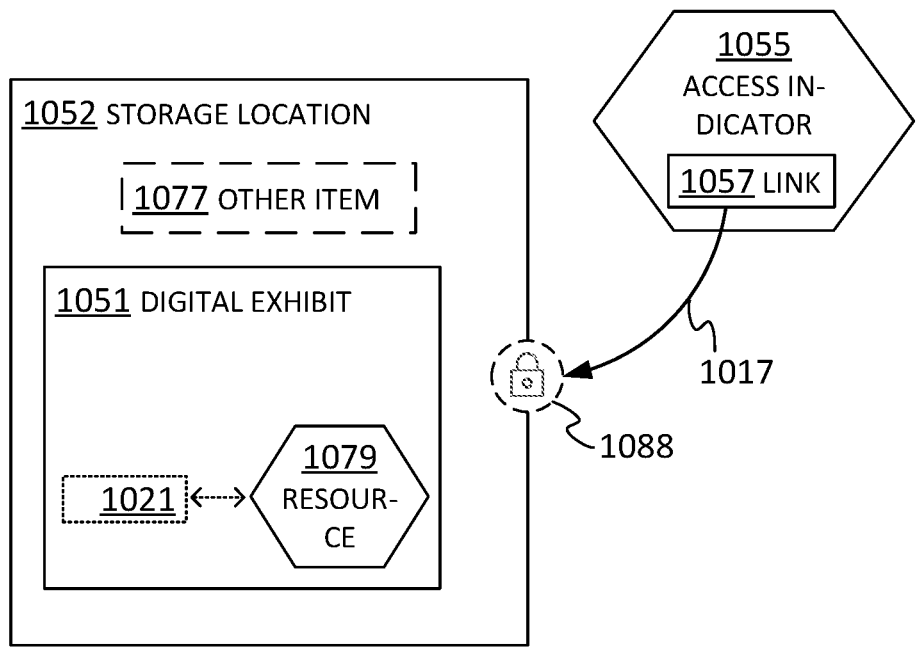
FIG. 10 is a diagram showing an access indicator that includes a link which leads to a storage location according to embodiments.

Referring now to FIG. 10, a sample storage location 1052 is shown. The storage location 1052 stores a digital exhibit 1051, and optionally also an other item 1077. The other item 1077 can be another, related digital exhibit, a log that is updated when certain events happen such as when the storage location 1052 or the digital exhibit 1051 are accessed, and so on.

The digital exhibit 1051 is arranged to report a resource 1079 as answering an identified requirement 1021. All of these elements can be as described above with reference to FIG. 1. In addition, an access indicator 1055 includes a link 1057 that leads to the storage location 1052, as shown by a lead arrow 1017. As such, a user actuating the link 1057 would reach the storage location 1052. From there, the user can find the digital exhibit 1051, plus any other items such as other item 1077. In some embodiments, the access indicator is a QR code that includes a link that leads to the storage location, and so on.

In some of these embodiments, while the link leads to the storage location, the storage location is further protected, as indicated by an optional lock 1088. In such embodiments, a passcode is further required to access the storage location by the user actuating the link 1057. The passcode can be managed to be available for those intended to have access to the contents of the storage location.

Figure 11:
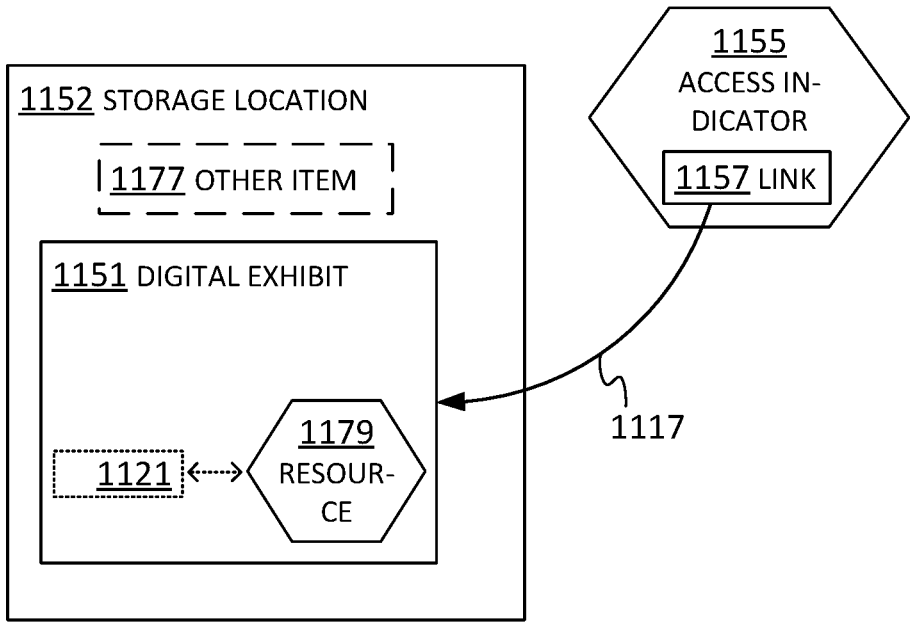
FIG. 11 is a diagram showing an access indicator that includes a link which leads to a digital exhibit that is stored in a storage location according to embodiments.

Referring now to FIG. 11, a sample storage location 1152 is shown. The storage location 1152 stores a digital exhibit 1151 and optionally also an other item 1177. The digital exhibit 1151 is arranged to report a resource 1179 as answering an identified requirement 1121. All of these elements can be as described above with reference to FIG. 1 and FIG. 10. In addition, an access indicator 1155 includes a link 1157 that leads to the digital exhibit 1151, when the digital exhibit 1151 is stored in the storage location 1152, as shown by a lead arrow 1117. As such, a user actuating the link 1157 would reach directly the digital exhibit 1151. In some embodiments, the access indicator is a QR code that includes a link that leads to the digital exhibit, when the digital exhibit is stored in the storage location, and so on. The digital exhibit can itself be password-protected, and so on.

Figure 12:
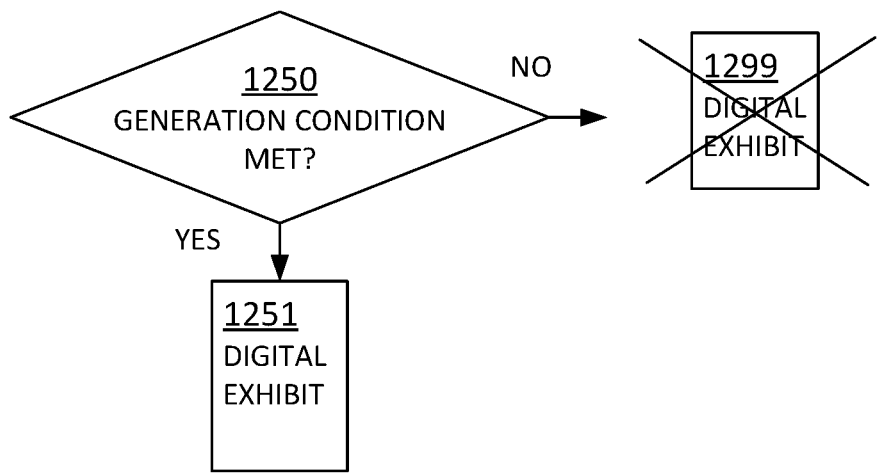
FIG. 12 is a flowchart segment for illustrating a sample portion of a method according to embodiments.

Referring now to FIG. 12, in some embodiments, the digital exhibit is prepared every time, meaning for every relationship instance. In other embodiments, however, it is determined by the computer system whether or not a generation condition is met, as shown in decision diamond 1250, which is a flowchart segment. In such embodiments, the digital exhibit is prepared responsive to the generation condition being met, as shown by a YES branch leading to a digital exhibit 1251, but is not prepared responsive to the generation condition not being met, as shown by a NO branch leading to a crossed-out digital exhibit 1299. Of course, when the digital exhibit is not prepared, no access indicator is input, and so on.

The generation condition may be implemented in a number of ways. For instance, in some embodiments the generation condition includes that the secondary entity 196 is associated with the certain domain 612, and that the primary entity 193 is not associated with the certain domain 162. In some embodiments, an operation may include consulting, by the computer system, a previous instruction about the primary entity. Such an instruction may have been given during setup, for instance as described above with reference to FIGS. 2A-2C. In such embodiments, it can be determined whether or not the generation condition is met responsive to the consulted previous instruction.

In some embodiments, an instruction of whether to prepare or not the digital exhibit is conveyed from the dataset 135 itself, with proper settings from the software development kit and so on. Examples are now described.

Figure 13:
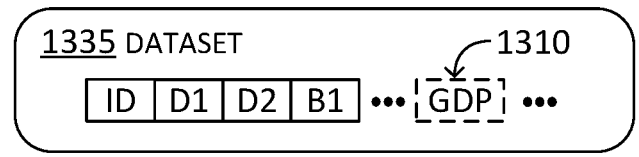
FIG. 13 is a diagram of a sample dataset that optionally includes a generation dataset parameter.

Referring now to FIG. 13, in some embodiments the generation condition includes that the dataset parameters include a generation dataset parameter. For instance, a sample dataset 1335 is shown, which is an example of the dataset 135. In particular, the dataset 1335 includes the same dataset parameters ID, D1, D2, B1, . . . as the dataset 135. In addition, the dataset 1335, by its design, may or may not include a generation dataset parameter 1310, which is shown in dashed lines because it is optional. The generation condition includes that the generation dataset parameter 1310 is included in the dataset 1335, else the digital exhibit will not be prepared.

Figure 14:
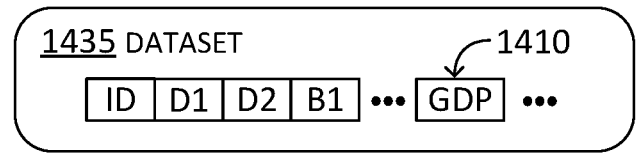
FIG. 14 is a diagram of a sample dataset that includes a generation dataset parameter with a specific dataset value.

Referring now to FIG. 14, in some embodiments the generation condition includes that the dataset parameters include a generation dataset parameter, and the generation dataset parameter has a specific dataset value. For instance, a sample dataset 1435 is shown, which is an example of the dataset 135. In particular, the dataset 1435 includes the same dataset parameters ID, D1, D2, B1, . . . as the dataset 135, plus a generation dataset parameter 1410. The generation condition includes that the generation dataset parameter 1410 has a specific dataset value, for instance a "1" as opposed to a "0", a "TRUE" as opposed to a "FALSE", and so on, else the digital exhibit will not be prepared. The specific dataset value need not be only of the either/or ("Boolean") type—alternately it can have a value that gives further instruction about the creation and/or storage of the digital exhibit.

Returning to FIG. 1, in embodiments a notification can be caused to be transmitted, e.g. via the communications network 188, by the computer system 195. In the example of FIG. 1, a notification 136 can be caused to be transmitted by the computer system 195. Optionally, the notification 136 is caused to be transmitted also as an answer or other response to the received dataset 135.

In some embodiments, a network address may be received by the computer system from a remote device. The network address can be for the other device. For instance, in some of these embodiments an additional operation may be parsing, by the computer system, from one the dataset parameters, a network address for the other device, as the network address could be included in the dataset. For another instance, in some of these embodiments an additional operation may be receiving, by the computer system from a remote device, a network address for the other device separately from the dataset.

In such embodiments, the notification is caused to be transmitted to the network address. For instance, the network address can be for the device 132 of the secondary entity 196.

The notification may include the access indicator 155, which is why the access indicator 155 is drawn entirely within the notification 136. In some embodiments, the access indicator includes a QR code that includes a link that leads to the storage location or to the digital exhibit when the digital exhibit is stored in the storage location, and the notification is an email that includes the QR code. The QR code can be in the body of the email, or provided as an attachment.

In some embodiments, the notification includes the produced resource in addition to the access indicator 155. Or, it can include an aspect of the resource, and possibly about the whole resource. In particular, the notification 136 may inform about the aspect of the resource 179, namely that it has been determined, or where it can be found, or what it is, or a portion of its content, or a value of it, or a statistic of the value, or a rounded version of the value, and so on. Of course, the planning should be such that the recipient of the notification 136 is able to parse what it is being provided, use it properly, and so on.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the communications network 188 responsive to the received request 184. The response 187 may be transmitted to the computer system 190, or to the OPF 189, and so on. As such, the other device can be the computer system 190, or the OPF 189, or the screen 191 of the user 192, and so on. In this example the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179, it can be advantageous to embed in the payload 137 the identity parameter (ID) and/or one or more parameters of the dataset 135. This will help the recipient correlate the response 187 to the request 184, and therefore match the received aspect of the resource 179 as the answer or other response to the appropriate dataset.

As seen above, the computer system 190, the computer system 195, and possibly also the OPF 189 may exchange requests and responses. Such can be implemented with a number of different architectures. Two examples are now described with reference to the computer systems 190 and 195 only.

In one such architecture, a device remote to the service engine 183, such as the computer system 190, may have a certain application (not shown) and a connector (not shown) that is a plugin that sits on top of that certain application. The connector may be able to fetch from the remote device the details required for the service desired from the OSP 198, form an object or payload (e.g. 134), and then send or push a request (e.g. 184) that carries the payload to the service engine 183 via a service call. The service engine 183 may receive the request with its payload. The service engine 183 may then access the digital resource rules 170, find the appropriate one(s) of them, and apply it or them to the payload to produce the requested resource 179. The service engine 183 may then form a payload (e.g. 137) that includes an aspect of the resource 179, and then push, send, or otherwise cause to be transmitted a response (e.g. 187) that carries the payload it formed to the connector. The connector receives the response, reads its payload, and forwards that payload to the certain application.

An alternative such architecture uses Representational State Transfer (REST) Application Programming Interfaces (APIs). REST or RESTful API design is designed to take advantage of existing protocols. While REST can be used over nearly any protocol, it usually takes advantage of Hyper Text Transfer Protocol (HTTP) when used for Web APIs. In such an alternative architecture, a device remote to the service engine 183, such as the computer system 190, may have a particular application (not shown). In addition, the computer system 195 implements a REST API (not shown). This alternative architecture enables the primary entity 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in the background to the service engine 183. Again, the service engine 183 determines the requested resource 179, and sends an aspect of it back to the REST API. In turn, the REST API sends the response 187 that has the payload 137 to the particular application.

Methods and algorithms are now described in more detail. These methods and algorithms are not necessarily inherently associated with any particular logic device or other apparatus. Rather, they are advantageously implemented by programs for use by a computing machine, such as a general-purpose computer, a special purpose computer, a microprocessor, etc. These algorithms are not necessarily purely mathematical, and are configured to address challenges particular to the problem solved, as will be apparent to a person skilled in the art. This detailed description may include flowcharts, display images, algorithms, and symbolic representations of program operations within at least one computer readable medium. An economy may be achieved in that a single set of flowcharts can be used to describe both programs, and also methods. So, while flowcharts describe methods in terms of boxes, they may also concurrently describe programs.

Figure 15:
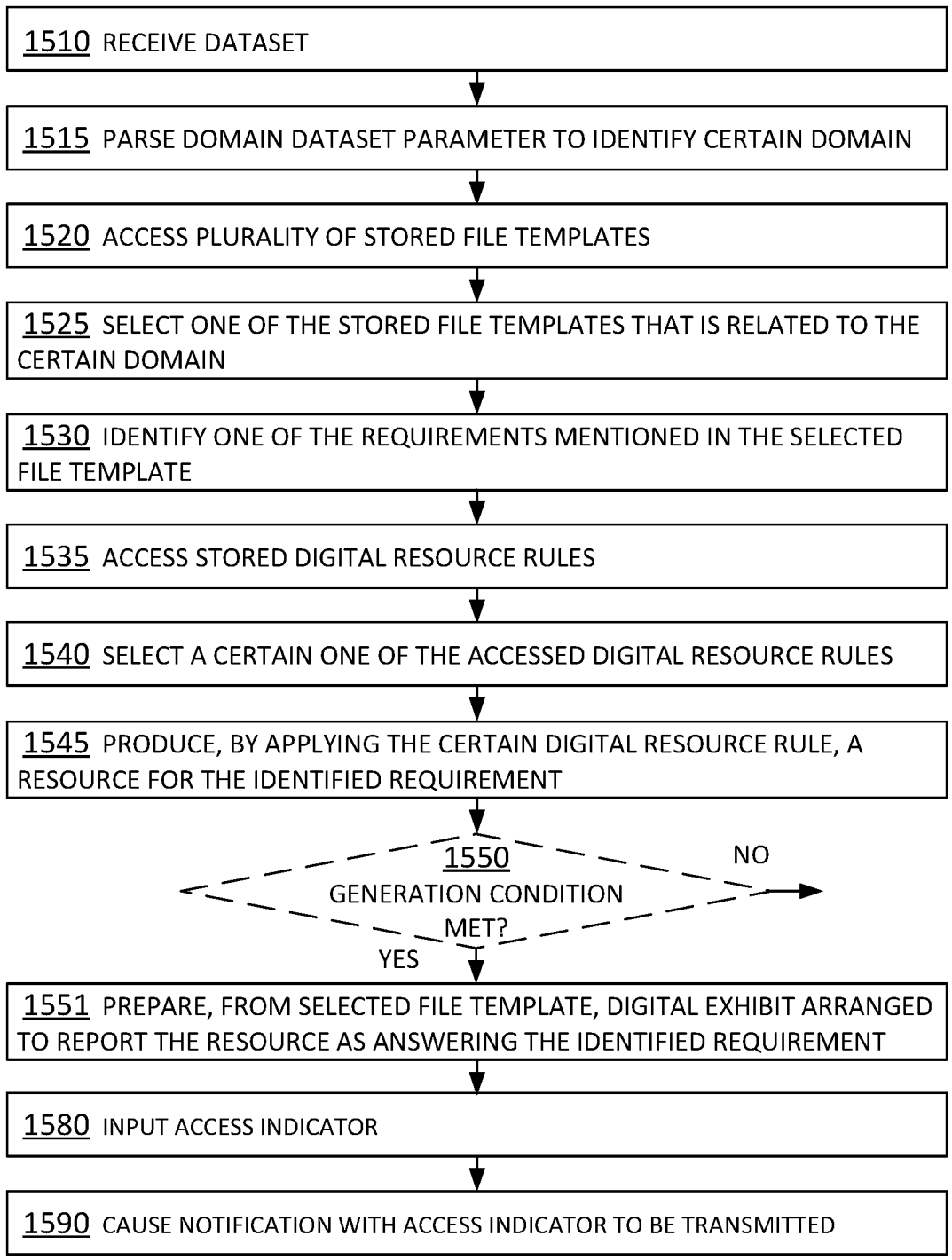
FIG. 15 is a flowchart for illustrating sample methods according to embodiments, which are improvements in automated computerized systems.

FIG. 15 shows a flowchart 1500 for describing methods according to embodiments. According to an operation 1510, a dataset is received.

According to another operation 1515, a domain dataset parameter of the dataset may be parsed to identify a certain domain.

According to another operation 1520, a plurality of stored file templates may be accessed.

According to another operation 1525, one of the stored file templates may be selected, which is related to the certain domain.

According to another operation 1530, one of the requirements mentioned in the selected file template may be identified.

According to another operation 1535, stored digital resource rules may be accessed.

According to another operation 1540, a certain one of the accessed digital resource rules may be selected.

According to another operation 1545, a resource for the identified requirement may be produced, by applying the certain digital resource rule.

According to another, optional operation 1550, it may be determined whether or not a generation condition is met. The operation 1550 has a YES and a NO branch. The NO branch can be the same as would be followed by the crossed out digital exhibit 1299 of FIG. 12, or involve other operations, such as sending an error message about generating the digital exhibit, sending a notification with only the resource, and so on.

Following the YES branch of the operation 1550, or just the operation 1545, according to another operation 1551, a digital exhibit may be prepared from the selected file template. As mentioned above, the digital exhibit can be arranged to report the resource as answering the identified requirement. If the optional operation 1550 is indeed implemented, then the operation 1551 can be implemented responsive to the generation condition being met, but not if the generation condition is not being met. The prepared digital exhibit can be stored in a storage location of a memory of the computer system, either while it is being prepared or after it has been prepared.

According to another operation 1580, an access indicator may be inputted. Optionally the inputted access indicator is also generated by the computer system.

According to another operation 1590, a notification may be caused to be transmitted to an other device. The notification may include the access indicator.

Figure 16:
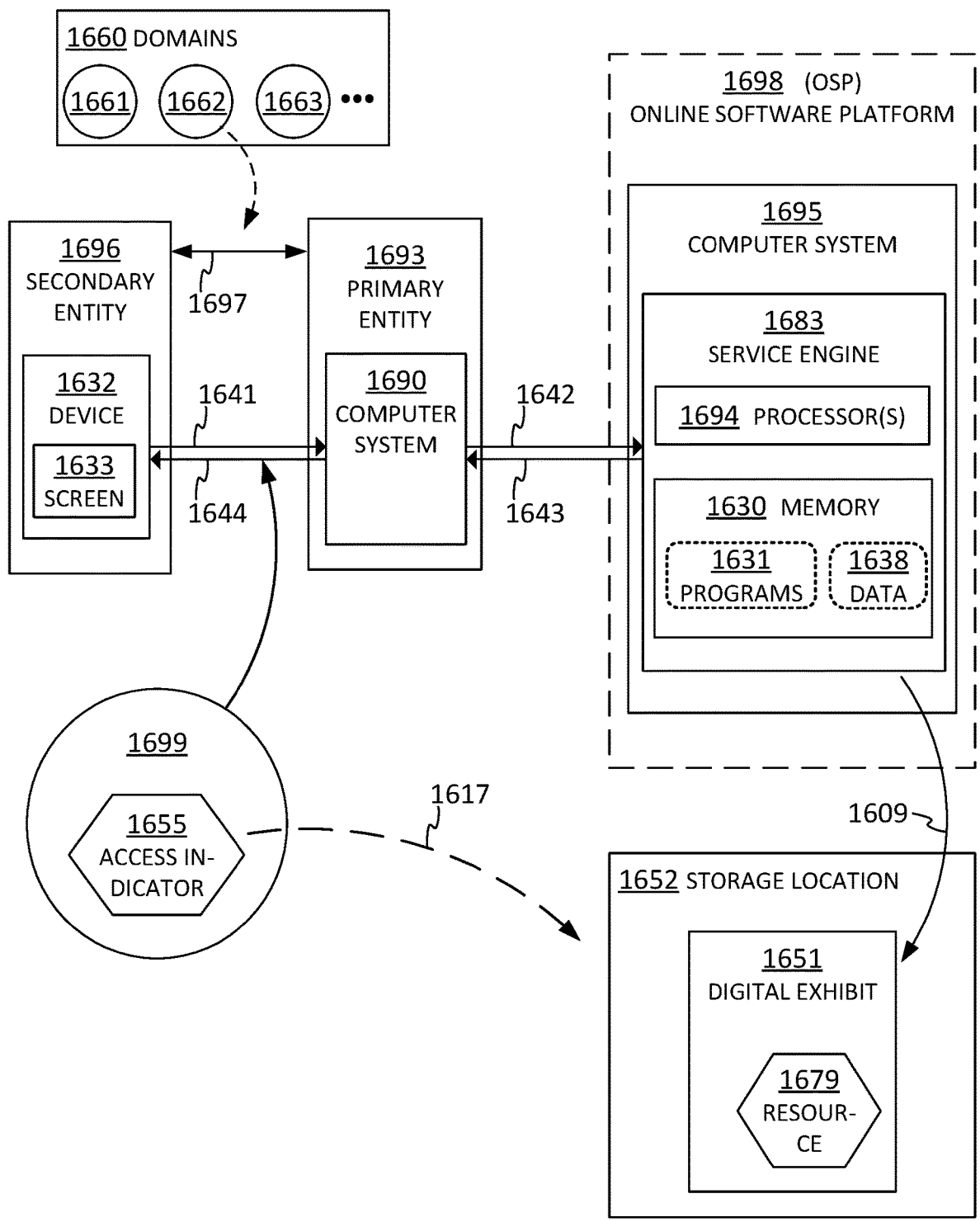
FIG. 16 is a diagram that repeats aspects of FIG. 1, and further shows sample embodiments where an access indicator is communicated to a secondary entity.

Referring now to FIG. 16, in a second set of embodiments a primary entity requests from an Online Service Provider (OSP) to produce a resource and to prepare a digital exhibit that reports the resource, then it receives from the OSP an access indicator that leads to the digital exhibit, and sends the access indicator to a secondary entity. Such embodiments are now described in more detail.

In particular, FIG. 16 shows many elements that can be as was described for similar elements of FIG. 1. An OSP 1698 has a computer system 1695. The computer system 1695 has one or more processors 1694 and a memory 1630. The memory 1630 may store programs 1631 and data 1638. Together, the processors 1694 and the memory 1630 may implement a service engine 1683.

A primary entity 1693 has a computer system 1690. A secondary entity 1696 has a device 1632 that has a screen 1633. A plurality 1660 of domains includes domains 1661, 1662, 1663, . . . . The certain domain 1662 is associated with one of the primary entity 1693 and the secondary entity 1696.

The secondary entity 1696 may want to form or conduct a relationship instance 1697 with the primary entity 1693. For this, at least a first communication 1641, a second communication 1642, a third communication 1643 and a fourth communication 1644 may be transmitted and received. Of those, the first communication 1641 may be similar to what was described in FIG. 1 for the first communication 141. Additional communications are optionally involved, sometimes intervening between these four. In addition, some of these communications are done in more than one parts. For instance, if data is given in a first part but additional data is required, the additional data can be received in a second part of the same communication.

In particular, the secondary entity 1696 may cause its device 1632 to transmit the first communication 1641 to the computer system 1690 of the primary entity 1693. The first communication 1641 may include data about a prospective relationship instance, or about the relationship instance 1697. The first communication 1641 may be received by the computer system 1690 from the device 1632. The first communication 1641 may be facilitated by the secondary entity 1696 entering data in a UI in the screen 1633 of the device 1632, of which a follow-up screen was seen in FIG. 3.

In embodiments, the computer system 1690 causes to be transmitted, via a communications network such as the communications network 188 and responsive to receiving the first communication 1641, the second communication 1642 to a service engine of an Online Service Provider (OSP). For instance, the recipient of the second communication 1642 can be the service engine 1683 of the OSP 1698, which is distinct from the computer system 1690. The second communication 1642 may include a dataset that has parameters which can also be called dataset parameters. At least some of the dataset parameters respective values that can also be called dataset values. The dataset values can be about the relationship instance 1697. At least one of the dataset parameters is a domain dataset parameter that has a domain dataset value that characterizes the certain domain 1662.

By including the dataset, this second communication 1642 can be programmed to cause the service engine 1683 to perform operations such as those that were described with reference to FIG. 15. In performing these operations for the example of FIG. 16, the resource produced during the operation 1545 is a resource 1679, the digital exhibit prepared during the operation 1551 is a digital exhibit 1651, and the prepared digital exhibit 1651 is stored in a storage location 1652 according to a storing arrow 1609. The storage location 1652 is shown as standalone, while in fact it could be part of the memory 1630, for instance as part of the data 1638. Or not, as was described for the storage location 152.

Moreover, in performing the operation 1580 for the example of FIG. 16, the access indicator could be an access indicator 1655, which can be adapted to facilitate viewing the digital exhibit 1651 when the digital exhibit 1651 is stored in the storage location 1652. Everything written about the access indicator 155 applies also to the access indicator 1655. In the example of FIG. 16, the facilitation of the viewing is generally indicated by a reference arrow 1617. The discussion about the reference arrow 117 applies also to the reference arrow 1617.

And, in performing the operation 1590 for the example of FIG. 16, the notification can be part of the third communication 1643. The third communication 1643 may thus include the access indicator 1655. As such, the computer system 1690 may receive the third communication 1643, which was caused to be transmitted by the service engine 1683. The third communication 1643 may or may not also include the resource 1679.

In embodiments, the computer system 1690 causes to be transmitted, responsive to the received third communication 1643, the fourth communication 1644 to the device 1632 of the secondary entity 1696.

The fourth communication 1644 may be visible on the screen 1633 as a UI. According to a comment 1699, the fourth communication 1644 includes the access indicator. The fourth communication 1644 may or may not also include the resource 1679.

Figure 17:
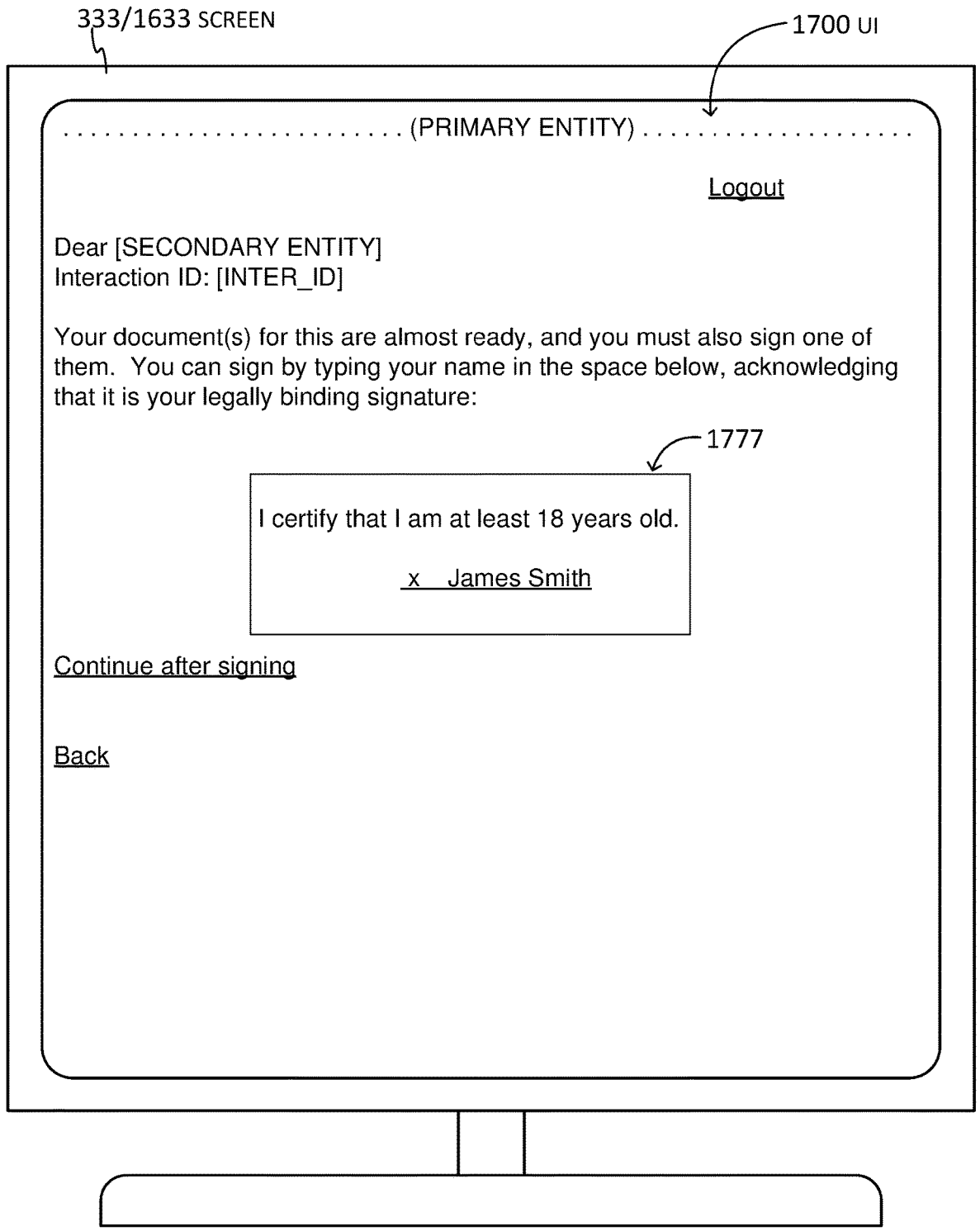
FIG. 17 is a sample view of a User Interface (UI) seen on a screen of a device of a secondary entity of FIG. 1 or of FIG. 16 in an embodiment, which could follow the UI of FIG. 3.

Referring now to FIG. 17, in some embodiments the first communication includes an electronic signature made by the secondary entity. In such embodiments, the exhibit includes the electronic signature. In the example of FIG. 17 a UI 1700 is shown in a screen that could be either the screen 333 of FIG. 3 or the screen 1633 of FIG. 16. Depending on the planned sequence of screens, the UI 1700 could follow the UI 300 of FIG. 3. The user is required to provide an electronic signature in a box 1777. When they do, the electronic signature can be carried first by the first communication 1641, and then all the way to the OSP 1698, and become attached to the digital exhibit.

Referring now to FIG. 18, in some embodiments the first communication includes a network address. In such embodiments, the fourth communication is caused to be transmitted to the network address. In the example of FIG. 18, a screen could be either the screen 333 or the screen 1633. A UI 1800 is shown on the screen, which could result from the fourth communication. Depending on the planned sequence of screens, the UI 1800 could follow the UI 300 of FIG. 3 or the UI 1700 of FIG. 17. The access indicator can be a link 1899 or a QR code 1855.

FIG. 19 shows a flowchart 1900 for describing methods according to embodiments. According to an operation 1910, a first communication may be received from a device of a secondary entity.

According to another operation 1920, a second communication can be caused to be transmitted to a service engine of an OSP. The second communication can be programmed to cause the service engine to prepare a digital exhibit, and cause to be transmitted back to the computer system a third communication that includes an access indicator to facilitate viewing the digital exhibit.

According to another operation 1930, the third communication may be received.

According to another operation 1940, a fourth communication can be caused to be transmitted to the device of the secondary entity. The fourth communication may include the access indicator.

Details about Computer Systems

Figure 20:
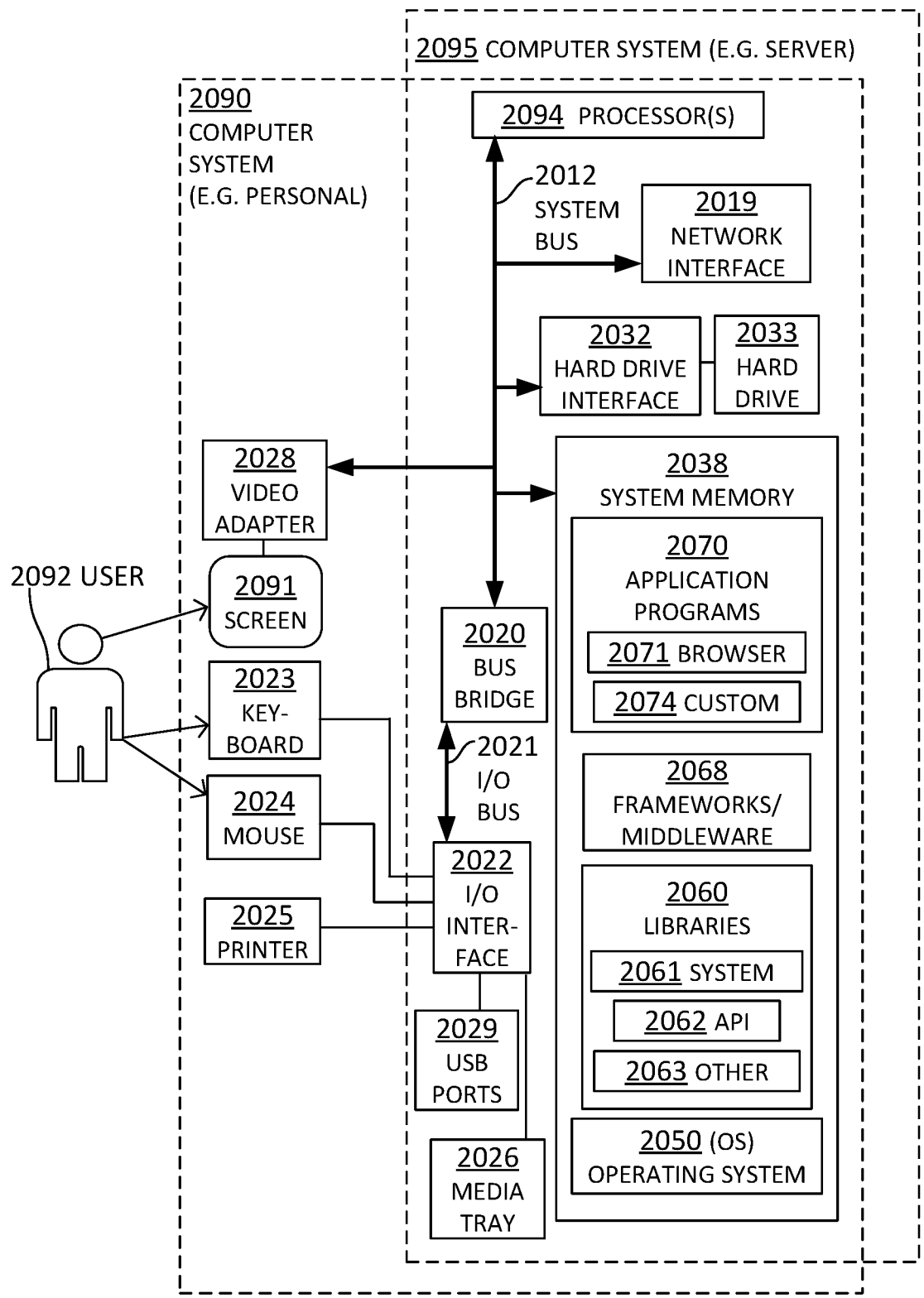
FIG. 20 is a block diagram showing additional components of sample computer systems according to embodiments, which are improvements in automated computerized systems.

FIG. 20 shows details for a sample computer system 2095 and for a sample computer system 2090. The computer system 2095 may be a server, while the computer system 2090 may be a personal device, such as a personal computer, a desktop computer, a personal computing device such as a laptop computer, a tablet computer, a mobile phone, and so on. Either type may be used for the computer system 195 and 190 of FIG. 1, and/or a computer system that is part of the OPF 189. Either type may be operated by a user 2092, who can be as other users described in this document.

The computer system 2095 and the computer system 2090 have similarities, which FIG. 20 exploits for purposes of economy in this document. It will be understood, however, that a component in the computer system 2095 may be implemented differently than the same component in the computer system 2090. For instance, a memory in a server may be larger than a memory in a personal computer, and so on. Similarly, custom application programs 2074 that implement embodiments may be different, and so on.

The computer system 2095 includes one or more processors 2094. The processor(s) 2094 are one or more physical circuits that manipulate physical quantities representing data values. The manipulation can be according to control signals, which can be known as commands, op codes, machine code, etc. The manipulation can produce corresponding output signals that are applied to operate a machine. As such, the one or more processors 2094 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 2095, or the computer system 2090, are not intended to be exhaustive. Rather, they are representative, for highlighting essential components that can be used with embodiments.

The computer system 2095 also includes a system bus 2012 that is coupled to the processor(s) 2094. The system bus 2012 can be used by the processor(s) 2094 to control and/or communicate with other components of the computer system 2095.

The computer system 2095 additionally includes a network interface 2019 that is coupled to system bus 2012. Network interface 2019 can be used to access a communications network, such as the communications network 188. Network interface 2019 can be implemented by a hardware network interface, such as a Network Interface Card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 2095 also includes various memory components. These memory components include memory components shown separately in the computer system 2095, plus cache memory within the processor(s) 2094. Accordingly, these memory components are examples of non-transitory machine-readable media. The memory components shown separately in the computer system 2095 are variously coupled, directly or indirectly, with the processor(s) 2094. The coupling in this example is via the system bus 2012.

Instructions for performing any of the methods or functions described in this document may be stored, completely or partially, within the memory components of the computer system 2095, etc. Therefore, one or more of these non-transitory computer-readable media can be configured to store instructions which, when executed by one or more processors 2094 of a host computer system such as the computer system 2095 or the computer system 2090, can be designed to or programmed to cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 2095 include a non-volatile hard drive 2033. The computer system 2095 further includes a hard drive interface 2032 that is coupled to the hard drive 2033 and to the system bus 2012.

The memory components of the computer system 2095 include a system memory 2038. The system memory 2038 includes volatile memory including, but not limited to, cache memory, registers and buffers. In embodiments, data from the hard drive 2033 populates registers of the volatile memory of the system memory 2038.

In some embodiments, the system memory 2038 has a software architecture that uses a stack of layers, with each layer providing a particular functionality. In this example the layers include, starting from the bottom, an Operating System (OS) 2050, libraries 2060, frameworks/middleware 2068 and application programs 2070, which are also known more simply as applications 2070. Other software architectures may include less, more or different layers. For example, a presentation layer may also be included. For another example, some mobile or special purpose operating systems may not provide a frameworks/middleware 2068.

The OS 2050 may manage hardware resources and provide common services. The libraries 2060 provide a common infrastructure that is used by the applications 2070 and/or other components and/or layers. The libraries 2060 provide functionality that allows other software components to perform tasks more easily than if they interfaced directly with the specific underlying functionality of the OS 2050. The libraries 2060 may include system libraries 2061, such as a C standard library. The system libraries 2061 may provide functions such as memory allocation functions, string manipulation functions, mathematical functions, and the like.

In addition, the libraries 2060 may include API libraries 2062 and other libraries 2063. The API libraries 2062 may include media libraries, such as libraries to support presentation and manipulation of various media formats such as MPREG4, H.264, MP3, AAC, AMR, JPG, and PNG. The API libraries 2062 may also include graphics libraries, for instance an OpenGL framework that may be used to render 2D and 3D in a graphic content on the screen 2091. The API libraries 2062 may further include database libraries, for instance SQLite, which may support various relational database functions. The API libraries 2062 may additionally include web libraries, for instance WebKit, which may support web browsing functionality, and also libraries for the applications 2070.

The frameworks/middleware 2068 may provide a higher-level common infrastructure that may be used by the applications 2070 and/or other software components/modules. For example, the frameworks/middleware 2068 may provide various Graphic User Interface (GUI) functions, high-level resource management, high-level location services, and so forth. The frameworks/middleware 2068 may provide a broad spectrum of other APIs that may be used by the applications 2070 and/or other software components/modules, some of which may be specific to the OS 2050 or to a platform.

The application programs 2070 are also known more simply as applications and apps. One such app is a browser 2071, which is a software that can permit the user 2092 to access other devices in the internet, for example while using a Graphic User Interface (GUI). The browser 2071 includes program modules and instructions that enable the computer system 2095 to exchange network messages with a network, for example using Hypertext Transfer Protocol (HTTP) messaging.

The application programs 2070 may include one or more of the aforementioned custom application programs 2074, made according to embodiments. These can be made so as to cause their host computer to perform operations according to embodiments. Of course, when implemented by software, operations according to embodiments may be implemented much faster than may be implemented by a human mind; for example, tens or hundreds of such operations may be performed per second according to embodiments, which is much faster than a human mind can do.

Other such applications 2070 may include a contacts application, a book reader application, a location application, a media application, a messaging application, and so on. Applications 2070 may be developed using the ANDROID™ or IOS™ Software Development Kit (SDK) by an entity other than the vendor of the particular platform, and may be mobile software running on a mobile operating system. The applications 2070 may use built-in functions of the OS 2050, of the libraries 2060, and of the frameworks/middleware 2068 to create user interfaces for the user 2092 to interact with.

The computer system 2095 moreover includes a bus bridge 2020 coupled to the system bus 2012. The computer system 2095 furthermore includes an input/output (I/O) bus 2021 coupled to the bus bridge 2020. The computer system 2095 also includes an I/O interface 2022 coupled to the I/O bus 2021.

For being accessed, the computer system 2095 also includes one or more Universal Serial Bus (USB) ports 2029. These can be coupled to the I/O interface 2022. The computer system 2095 further includes a media tray 2026, which may include storage devices such as CD-ROM drives, multi-media interfaces, and so on.

The computer system 2090 may include many components similar to those of the computer system 2095, as seen in FIG. 20. In addition, a number of the application programs may be more suitable for the computer system 2090 than for the computer system 2095.

The computer system 2090 further includes peripheral input/output (I/O) devices for being accessed by a user more routinely. As such, the computer system 2090 includes a screen 2091 and a video adapter 2028 to drive and/or support the screen 2091. The video adapter 2028 is coupled to the system bus 2012.

The computer system 2090 also includes a keyboard 2023, a mouse 2024, and a printer 2025. In this example, the keyboard 2023, the mouse 2024, and the printer 2025 are directly coupled to the I/O interface 2022. Sometimes this coupling is via the USB ports 2029.

In this context, "machine-readable medium" refers to a component, device or other tangible media able to store instructions and data temporarily or permanently and may include, but is not be limited to, a portable computer diskette, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, or any suitable combination of the foregoing. The machine that would read such a medium may include the one or more processors 2094.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general, non-programmed machine into a particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples— Use Cases

The above-mentioned embodiments have one or more uses. Aspects presented below may be implemented as was described above for similar aspects. Some, but not all of these aspects even have reference numerals similar to the above, for ease of explanation.

Use cases include where the sale of certain items is specially regulated, and/or taxed, and/or require proof that tax has been paid. In such use cases, the production of the resource is the computation of the tax obligation, the exhibit is the document that mentions the tax, and the access indicator facilitates viewing the document. Examples are now described.

Figure 21:
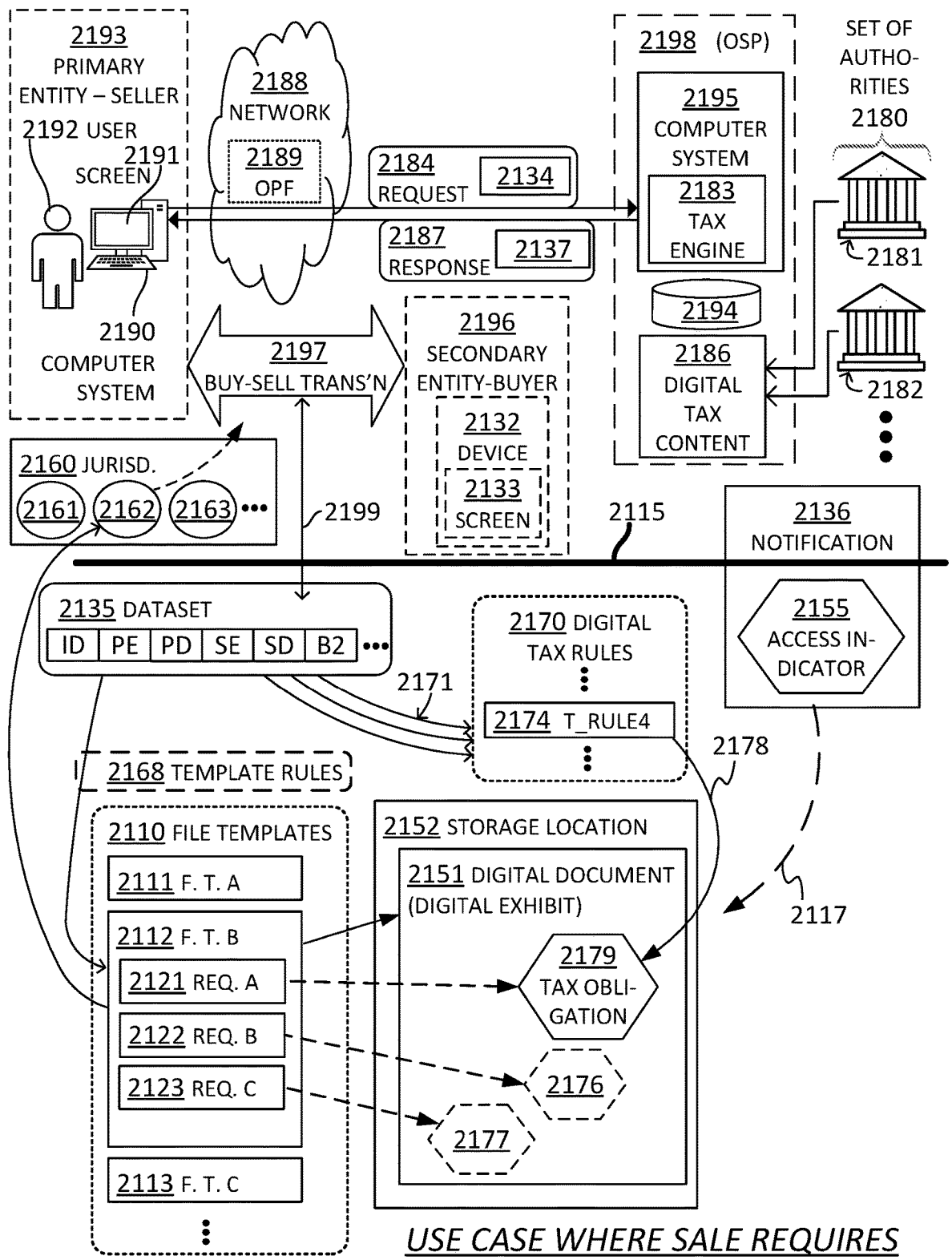
FIG. 21 is a diagram of sample aspects for describing operational examples and use cases of embodiments.

FIG. 21 is a diagram for an operational example where a use case of the relationship instance 197 is a buy-sell transaction 2197, and where further the authorities of a jurisdiction impose a tax on the transaction 2197 and where further the authorities require a document that mentions the tax. The transaction 2197 is conducted between a primary entity 2193, which is a seller, and a secondary entity 2196, which is a buyer. The transaction 2197 is therefore a buy-sell transaction between them, for instance for a physical item, but it could be a non-physical item such as a digital item, a specific right, and so on.

The tax obligation 2179 often arises from the transaction 2197— in particular a sales and/or use tax must be paid by either the primary entity 2193 or the secondary entity 2196. A computation of the tax obligation 2179 is a use case of producing the resource 179.

Use cases also include sales across the borders of different jurisdictions. While in this document the word "tax" is used for the money owed to authorities as tax, in such use cases terms like: "customs", "duties", "import tax", "levy", "tariff", etc. are instead used, for what is, in effect, a tax.

In such use cases, the attribute of an entity in a dataset is any one of the entity's name, type of entity, a physical location such as an address, a contact information element, an affiliation, a characterization of another entity, a characterization by another entity, an association or relationship with another entity (general or specific instances), an asset of the entity, a declaration by or on behalf of the entity, and so on. Different resources may be produced in such instances, and so on.

It will be recognized that aspects of FIG. 21 have similarities with aspects of FIG. 1. Portions of such aspects may be implemented as described for analogous aspects of FIG. 1. In particular, a thick horizontal line 2115 separates FIG. 21, although not completely or rigorously, into a top portion and a bottom portion. Above the line 2115 are shown elements with emphasis mostly on entities, components, their relationships, and their interactions, while below the line 2115 are shown elements with emphasis mostly on processing of data that takes place often within one or more of the components that are shown above the line 2115.

Above the line 2115, a computer system 2195 is shown, which is used to help customers, such as a user 2192, with tax compliance. For instance, the user 2192 may log into the computer system 2195 by using credentials, such as a user name, a password, a token, and so on. Further in this example, the computer system 2195 is part of an OSP 2198 that is implemented as a Software as a Service (SaaS) provider, for being accessed by the user 2192 online. As such, the OSP 2198 can be an online service provider for clients. Alternately, the functionality of the computer system 2195 may be provided locally to a user.

The user 2192 may be standalone. The user 2192 may use a computer system 2190 that has a screen 2191. In embodiments, the user 2192 and the computer system 2190 are considered part of the primary entity 2193, which is also known as entity 2193. The primary entity 2193 can be a business, such as a seller of items, a reseller, a buyer, a service business, and so on. In such instances, the user 2192 can be an employee, a contractor, or otherwise an agent of the entity 2193. The buyer 2196 can be an organization, a person, and so on. The buyer 2196 has a device 2132 with a screen 2133. The buyer 2196 may have used a device such as the device 2132 for the buy-sell transaction 2197. The buy-sell transaction 2197 may involve an operation, such as an exchange of data to form an agreement. This operation can be performed in person, or over a network 2188, which can be as described elsewhere for communications networks, etc. In such cases the entity 2193 can even be an online seller, but that is not necessary. The transaction 2197 will have data that is known to the entity 2193, similarly with what was described by the relationship instance 197 of FIG. 1.

In a number of instances, the user 2192 and/or the entity 2193 use software applications to manage their business activities, such as sales, resource management, production, inventory management, delivery, billing, and so on. The user 2192 and/or the entity 2193 may further use accounting applications to manage purchase orders, sales invoices, refunds, payroll, accounts payable, accounts receivable, and so on. Such software applications, and more, may be used locally by the user 2192, or from an Online Processing Facility (OPF) 2189 that has been engaged for this purpose by the user 2192 and/or the entity 2193. The OPF 2189 can be analogous to the OPF 189. In such use cases, the OPF 2189 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

A plurality 2160 of jurisdictions includes jurisdictions 2161, 2162, 2163, . . . , which are use cases of the plurality 160 of domains 161, 162, 163, . . . . Rules for these jurisdictions are promulgated by a set 2180 of respective different authorities 2181, 2182 . . . . In some use cases, the jurisdiction, and its rules, are about regulating the sale of certain items. In some use cases the jurisdiction, and its rules, are simply about geography.

Businesses have tax obligations to various authorities of respective jurisdictions, such as tax authorities of respective tax jurisdictions. It is often challenging to even determine what taxes are owed and to whom, because the underlying statutes and tax rules and guidance issued by the authorities are very complex. There are various types of tax, such as sales tax, use tax, excise tax, value-added tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are often defined by geography. Businesses have tax obligations to various authorities within the respective tax jurisdictions. There are various authorities, such as that of a group of countries, of a single country, of a state, of a county, of a municipality, of a city, of a local district such as a local transit district and so on. So, for example, when a business sells items in transactions that can be taxed by an authority, the business may have the tax obligations to the authority. These obligations include requiring the business to: a) register itself with the authority's taxing agency, b) set up internal processes for collecting sales tax in accordance with the sales tax rules of the authority, c) maintain records of the sales transactions and of the collected sales tax in the event of a subsequent audit by the taxing agency, d) periodically prepare a form ("tax return") that includes an accurate determination of the amount of the money owed to the authority as sales tax based on the sales transactions, e) file the tax return with the authority by a deadline determined by the authority, and f) pay ("remit") that amount of money to the authority. In such cases, the filing and payment frequency and deadlines are determined by the authority.

A challenge for businesses is that the above-mentioned software applications generally cannot provide tax information that is accurate enough for the businesses to be tax compliant with all the relevant authorities. The lack of accuracy may manifest itself as errors in the amounts determined to be owed as taxes to the various authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the authorities—if the seller cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome for the amounts of money involved. On the other hand, if a seller under-estimates the sales tax due, then the seller collects less sales tax from the buyers, and therefore pays less sales tax to the authorities than was actually due. That is an underpayment of sales tax that will likely be discovered later, if the authority audits the seller. Then the seller will be required to pay the difference, plus fines and/or late fees, because ignorance of the law is not an excuse. Further, one should note that sales taxes can be considered trust-fund taxes, meaning that the management of a company may be held personally liable for the unpaid sales tax.

For sales in particular, making correct determinations for sales and use tax is even more complex, and therefore difficult. There are a number of factors that contribute to the complexity.

First, some state and local authorities have origin-based tax rules, while others have destination-based tax rules. Accordingly, a sales tax may be charged from the seller's location, meaning according to the rules of the authority of the seller, or from the buyer's location, meaning according to the rules of the authority of the buyer.

Second, the various authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. As the United States switched, largely but not completely, from primarily origin-based sales tax to destination-based tax, the number of tax jurisdictions rapidly multiplied, and the incentives for local governments to implement new and varied tax rules and ever smaller jurisdictions multiplied. As such, there are over 10,000 different tax jurisdictions in the US, with many partially overlapping. Their sizes vary from as large as many square miles to as small as a single building. In parallel, tens of thousands of tax rules and tax rates have been developed.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is, and/or what the purchase is for. For example, certain entities are exempt from paying sales tax on their purchases, as long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid. And, certificates of exemption may expire after some time, and may need to be renewed or reissued.

Fifth, it can be hard to determine which authorities a seller owes sales tax to. A seller may start with tax jurisdictions that it has a physical presence in, such as a main office, a distribution center or warehouse, an employee working remotely, and so on. Such ties with a tax jurisdiction establish the so-called physical *nexus*. However, an authority such as a state or even a city may set its own *nexus* rules for when a business is considered to be "engaged in business" with it, and therefore that business is subject to registration and collection of sales taxes. These *nexus* rules may include different types of *nexus*, such as affiliate *nexus*, click-through *nexus*, cookie *nexus*, economic *nexus* with thresholds, and so on. For instance, due to economic *nexus*, a remote seller may owe sales tax for sales made in the jurisdiction that are a) above a set threshold volume, and/or b) above a set threshold number of sales transactions.

The economic *nexus* mentioned above can be even more complicated. Even where a seller might not have reached any of the thresholds for economic *nexus*, a number of states are promulgating marketplace facilitator laws that sometimes use such thresholds. According to such laws, intermediaries that are characterized as marketplace facilitators per laws of the state may have an obligation, instead of the seller, to collect sales tax on behalf of their sellers, and remit it to the state. The situation becomes even more complex when a seller sells directly to a state, and also via such an intermediary.

All these may become even more complex when a sale from one jurisdiction is made to another, such as in cross-border trace.

To help with such complex determinations, the computer system 2195 may be specialized for tax compliance. The computer system 2195 may have one or more processors and memory, for example as was described for the computer system 195 of FIG. 1. The computer system 2195 thus implements a tax engine 2183 to make the determinations of tax obligations. The tax engine 2183 can be as described for the service engine 183.

The computer system 2195 may further store locally entity data, i.e. data of user 2192 and/or of entity 2193, either of which/whom may be a customer, and/or a seller or a buyer in a sales transaction. The entity data may include profile data of the customer, and transaction data from which a determination of a tax obligation is desired. In the online implementation of FIG. 21, the OSP 2198 has a database 2194 for storing the entity data. This entity data may be inputted by the user 2192, and/or caused to be downloaded or uploaded by the user 2192 from the computer system 2190 or from the OPF 2189, or extracted from the computer system 2190 or from the OPF 2189, and so on. In other implementations, a simpler memory configuration may suffice for storing the entity data.

A digital tax content 2186 is further implemented within the OSP 2198. The digital tax content 2186 can be a utility that stores digital tax rules 2170 for use by the tax engine 2183. As part of managing the digital tax content 2186, there may be continuous updates of the digital tax rules, by inputs gleaned from the set 2180 of the different authorities 2181, 2182, . . . . Updating may be performed by humans, or by computers, and so on. As mentioned above, the number of the different authorities in the set 2180 may be very large. In such use cases, tax jurisdictions such as a country, a state, a city, a municipality, etc. correspond to domains discussed earlier in this document.

For a specific determination of a tax obligation, the computer system 2195 may receive one or more datasets. A sample received dataset 2135 is shown just below line 2115. The dataset 2135 has parameters that can also be called dataset parameters, some of which can have respective dataset values, and can be otherwise examples of what was described for the dataset 135 of FIG. 1. In this example, the computer system 2190 transmits a request 2184 that includes a payload 2134, and the dataset 2135 is received by the computer system 2195 parsing the received payload 2134. In this example the single payload 2134 encodes the entire dataset 2135, but that is not required, as mentioned above.

In this example, the dataset 2135 has been received because it is desired to determine any tax obligations arising from the buy-sell transaction 2197. As such, the sample received dataset 2135 has dataset parameters with values that characterize attributes of the buy-sell transaction 2197, as indicated by a correspondence arrow 2199. Accordingly, in this example the sample received dataset 2135 has a parameter ID with a value for an identity of the dataset 2135 and/or the transaction 2197. The dataset 2135 also has a parameter PE with a value for the name of the primary entity 2193 or the user 2192, which can be the seller making sales transactions, some perhaps online. The dataset 2135 further has an optional parameter PD with a value for relevant data of the primary entity 2193 or the user 2192, such as an address, place(s) of business, prior *nexus* determinations with various tax jurisdictions, and so on. The parameter PD is optional because it may be possible to look up its value from the parameter PE. The dataset 2135 also has a parameter SE with a value for the name of the secondary entity 2196, which can be the buyer. The dataset 2135 further has a parameter SD with a value for relevant data of the secondary entity 2196, entity-driven exemption status, and so on. In some instances, the parameter SD is optional, similarly with the parameter PD. The dataset 2135 has a parameter B2 with a numerical value for the sale price of the item sold. The dataset 2135 may further have additional dataset parameters, as indicated by the dot-dot-dot in the right side of the dataset 2135. These parameters may characterize further attributes, such as what item was sold, for example by a Stock Keeping Unit (SKU), how many units of the item were sold in the transaction 2197, a date and possibly also time of the transaction 2197, and so on.

In the example of FIG. 21, a plurality 2110 of stored file templates are accessed. These file templates include File Template A 2111, File Template B 2112, File Template C 2113, . . . . These file templates can be forms for filling in by a person, which are required by authorities. At least some of these file templates are associated respectively with the jurisdictions 2161, 2162, 2163 in the plurality 2160 of jurisdictions. For instance, the File Template B 2112 is associated with the certain jurisdiction 2162, as shown by an arrow.

In the example of FIG. 21, the File Template B 2112 is selected by the computer system 2195, responsive to at least the domain dataset value that has been parsed as per the above. The domain dataset value can be an address that determines a location, and therefore determines the jurisdiction 2162.

The selection can be made in a number of ways. For instance, a plurality 2168 of stored template rules can be accessed by the computer system 2195. In such embodiments, the selecting of the one of the stored file templates is performed by applying the domain dataset value to the plurality of stored template rules. For example, a selection can be made by the name of a jurisdiction, the types of goods involved in the sale, and so on.

Further, these forms mention requirements for what needs to be filled in. In the example of FIG. 21, the File Template B 2112 mentions a Requirement A 2121, a Requirement B 2122, and a Requirement C 2123.

In the example of FIG. 21, a digital document 2151 is prepared by the computer system 2195 and from the selected File Template B 2112. The digital document 2151 is a use case of the digital exhibit 151. The digital document 2151 is stored in a storage location 2152 while being prepared, or after it is prepared.

The digital document 2151 is arranged to report entries 2176, 2177 as answering the Requirement B 2122 and the Requirement C 2123. The entries 2176, 2177 may be provided from values of the dataset 2135, from known values about the seller 2193, and so on. In addition, the digital document 2151 is arranged to report the tax obligation 2179.

In addition, an access indicator 2155 is created. The access indicator 2155 is adapted to facilitate viewing the digital document 2151, when the digital document 2151 is stored in the storage location 2152. In the example of FIG. 21, the facilitation of the viewing is generally indicated by a reference arrow 2117. As with before, the facilitation may be implemented by a link, for instance provided by a QR code. A user actuating the link would reach the digital document 2151 directly, or a subfolder.

The computer system 2195 may then cause a notification 2136 to be transmitted. In the example of FIG. 21, the notification 2136 is caused to be transmitted by the computer system 2195 as an answer to the received dataset 2135, but other implementations are possible. The notification 2136 can carry the access indicator 2155, similarly with the notification 136 of FIG. 1.

The notification 2136 can be transmitted to one of an output device and another device that can be the remote device, from which the dataset 2135 was received. The output device may be the screen of a local user or a remote user. The notification 2136 may thus cause a desired image to appear on the screen, such as within a Graphical User Interface (GUI) and so on. The other device may be a remote device, as in this example. In particular, the computer system 2195 causes the notification 2136 to be communicated by being encoded as a payload 2137, which is carried by a response 2187. The response 2187 may be transmitted via a communications network 2188 responsive to the received request 2184. The communications network 2188 can be as described for the communications network 188, even the same network. The response 2187 may be transmitted to the computer system 2190, or to the OPF 2189, and so on. As such, the other device can be the computer system 2190, or a device of the OPF 2189, or the screen 2191 of the user 2192, and so on. In this example the single payload 2137 encodes the entire notification 2136, but that is not required, similarly with what is written above about encoding datasets in payloads. Of course, along with the aspect of the tax obligation 2179, it is advantageous to embed in the payload 2137 the ID parameter and/or one or additional more parameters of the dataset 2135. This will help the recipient correlate the response 2187 that they receive to their request 2184, and therefore match the received aspect of the tax obligation 2179 as the answer to the transmitted dataset 2135.

The digital tax rules 2170 are digital in that they are implemented for use by software, similarly with these rules 170. The digital tax rules 2170 can be created so as to accommodate legal tax rules that the set 2180 of different authorities 2181, 2182 . . . promulgate. In the example of this diagram, only one sample digital tax rule is shown explicitly, namely rule T_RULE4 2174. In this diagram, all other such rules are indicated by the vertical dot-dot-dots.

Then the computer system 2195 may select a certain one of the digital tax rules 2170. In this example, the rule T_RULE4 2174 is thus selected. The selection of this particular rule is indicated also by the fact that an arrow 2178 begins from that rule. The arrow 2178 is similar to the arrow 178.

The computer system 2195 may thus select the certain rule T_RULE4 2174 responsive to one or more of the dataset values of the dataset parameters of the dataset 2135. The impact of the dataset 2135 in the selection is indicated by at least some of the arrows 2171, similarly with the arrows 171. For example, it can be recognized that a condition of the digital tax rule T_RULE4 2174 is met by one or more of the values of the dataset parameters of the dataset 2135. For instance, it can be further determined that, at the time of the sale, the buyer 2196 is located within the boundaries of a tax jurisdiction, that the seller 2193 has *nexus* with that tax jurisdiction, and that there is no tax holiday.

As such, the computer system 2195 may produce the tax obligation 2179, which is akin to producing the resource 179 of FIG. 1. The tax obligation 2179 can be produced by the computer system 2195 applying the certain digital tax rule T_RULE4 2174, as indicated by the arrow 2178. The impact of the dataset 2135 in producing the tax obligation 2179 is indicated by at least one of the arrows 2171. In this example, the identified certain digital tax rule T_RULE4 2174 may specify that a sales tax is due, that the amount is to be determined by a multiplication of the sale price of the value of the parameter B2 by a specific rate, the tax return form that needs to be prepared and filed, a date by which it needs to be filed, and so on.

The digital tax rules 2170 can be implemented or organized in different ways. For example, these digital tax rules 2170 may have applicability conditions that relate to geographical boundaries, effective dates with possible temporary exceptions, item classification into categories, differently-treated parties, and so on, for determining where and when a certain digital tax rule is to be selected and applied, to determine the tax obligation 2179. These conditions may be expressed as logical conditions with ranges, dates, other data, and so on. Values of the dataset parameters of the dataset 2135 can be iteratively tested against these logical conditions according to arrows 2171. In such cases, the applicable tax rules may indicate how to compute one or more tax obligations, such as to indicate different types of taxes that are due, rules, rates, exemption requirements, reporting requirements, remittance requirements, the actual amounts of tax obligations, etc.

As with the digital resource rules 170, the digital tax rules 2170 may also be complex. While a certain one of these digital resource rules is eventually selected and applied to determine the tax obligation, more than one of them may be used for selecting that certain one.

Figure 22:
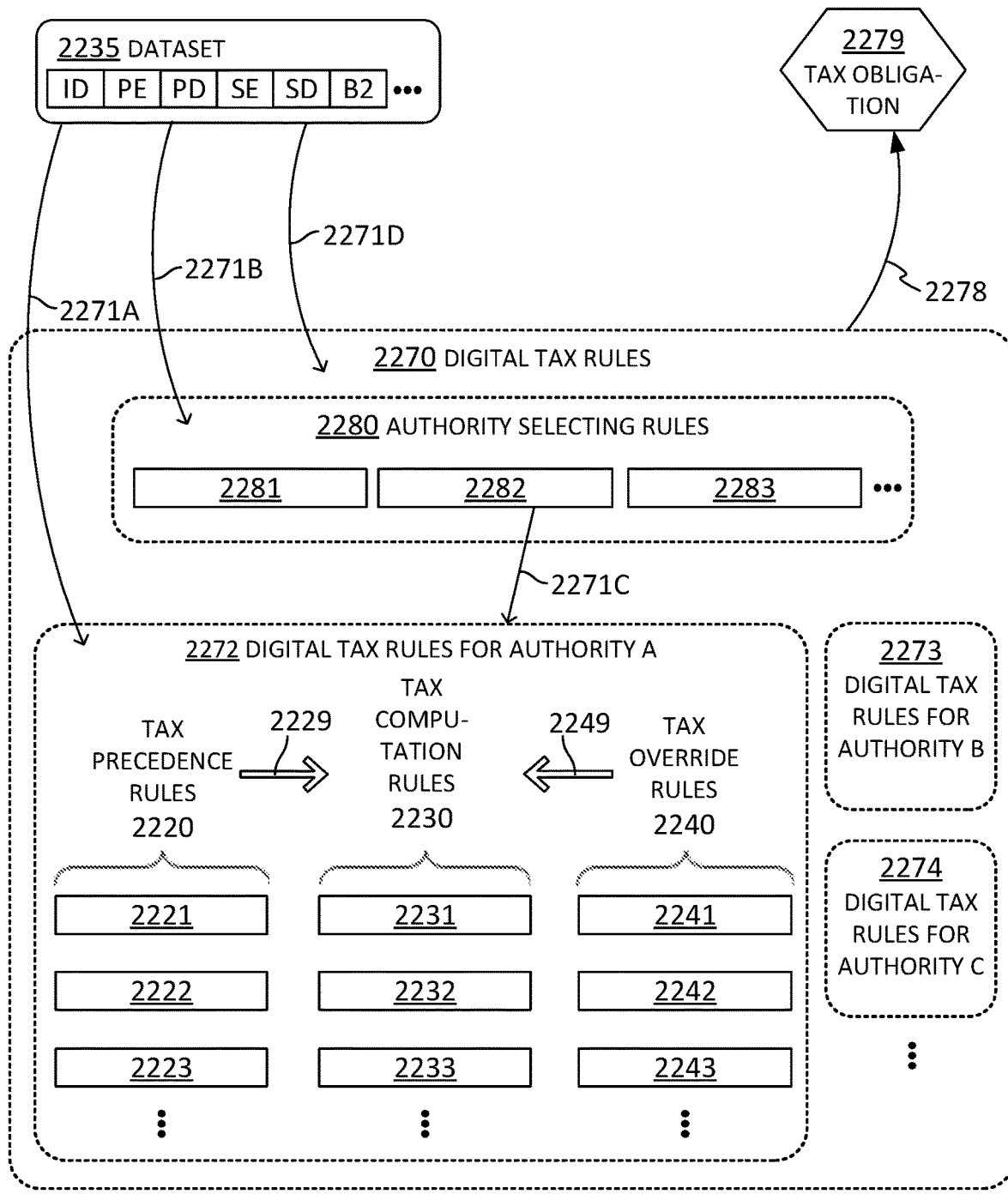
FIG. 22 is a diagram showing details and aspects of different types of possible embodiments of the digital tax rules of the use cases of FIG. 21.

Referring now to FIG. 22, a dataset 2235 can be as described for the dataset 2135 of FIG. 21. In addition, a set 2270 of digital tax rules is an example of the digital tax rules 2170 of FIG. 21. A tax obligation 2279 can be produced according to the arrow 2278. The tax obligation 2279 can be as described for the tax obligation 2179. And it will be further recognized that FIG. 22 has many similarities with FIG. 4. This is intentional, so that portions of the explanations for FIG. 4 also apply to FIG. 22.

The set 2270 of digital tax rules shows examples for digital tax rules, such as the digital tax rules 2170 of FIG. 21. The set 2270 of digital tax rules includes different subsets, into which the individual rules belong. In addition, there can be hierarchical relationships among rules of different subsets, and/or of types. In this example, the set 2270 includes a subset 2280 of authority selecting rules. The set 2270 also includes subsets 2272, 2273, 2274, . . . , each for digital tax rules for authorities A, B, C, . . . respectively. An authority for which a subset of tax rules is thus provided could be associated with the primary entity 2193, another authority could be associated with the secondary entity 2196, and so on. In cases where digital tax rules are provided only for the authority A, the tax obligation 2279 will be determined by starting from an arrow 2271A.

The subset 2280 includes rules 2281, 2282, 2283, . . . . The subset 2280 may be invoked, e.g. per an arrow 2271B, when multiple jurisdictions are candidates. These rules may select which tax jurisdiction's rules will be applied, e.g. per an arrow 2271C. For instance, the rules of the subset 2280 may be used to resolve whether a sales tax determination will be origin-based or destination-based. This may depend on appropriate rules of the tax jurisdictions themselves. Then the rules of the subset 2280 may point to the digital tax rules of one or more authorities whose legal tax rules must be followed. For instance, and as mentioned above, a buy-sell transaction may be burdened by a sales tax from the tax jurisdictions of a state and of a city. These could invoke, respectively, the subsets 2272 and 2273.

Digital tax rules for individual authorities are now described. Such rules need not be the same for each authority, or of the same type for each domain. The sample subset 2272 of digital tax rules for authority A is now described in more detail. Its description can be similar for subsets for other domains, such as the subsets 2273, 2274, . . . .

The subset 2272 includes different types of rules. In this example, the subset 2272 includes tax precedence rules 2220, tax computation rules 2230, and tax override rules 2240. In this example, the tax precedence rules 2220 include rules 2221, 2222, 2223, . . . . The tax computation rules 2230 include rules 2231, 2232, 2233, . . . . The tax override rules 2240 include rules 2241, 2242, 2243, . . . .

In embodiments, one of the tax computation rules 2230 may ordinarily be selected as the certain digital tax rule, which in FIG. 21 is shown as rule T_RULE4 2174. For instance, it may specify a percentage tax rate for the sales tax. The tax obligation 2279 may be the percentage rate. Or, the purchase price (base value of the parameter B2) may be further learned from the dataset 2235, e.g. per an arrow 2271D, and the tax obligation 2279 may be the sales tax amount, produced by multiplying the percentage rate by the purchase price.

In addition, although not always required, the different types of rules within the subset 2272 further have different hierarchies among them.

For a first instance, one of the tax precedence rules 2220 may indicate which one of the tax computation rules 2230 is to be selected, as generally indicated by an arrow 2229. As an example, one of the tax precedence rules 2220 may decide the taxability of a specific item indicated in the dataset 2235. Such a tax precedence rule may implement, therefore, an item classification task. The answer can be no sales tax, or different sales tax depending on different categories. For instance, bagels may be taxed differently depending on whether or not they are sold with utensils, based on whether or not they are pre-sliced when sold, and so on. Then the precedence rule may indicate which one of the tax computation rules 2230 is the appropriate one to use for the computation of the sales tax. As another example, one of the tax precedence rules 2220 may indicate that there is a temporary sales tax holiday in a tax jurisdiction on the day of the transaction, in which case the sales tax for the transaction 2197 of FIG. 21 will be zero, and the tax obligation will be computed accordingly. As one more example, one of the tax precedence rules 2220 may indicate that there is no economic *nexus* for this transaction which, alone or in combination with other *nexus* determinations, may determine that no sales tax will be imposed.

For a second instance, even when one of the tax computation rules 2230 is thus indicated, one of the tax override rules 2240 may still override the indication, as generally indicated by an arrow 2249. As an example, one of the tax override rules 2240 may indicate that a party is exempt from paying sales tax because certain conditions are met, for instance if they have a valid and current exemption certificate. As another example, rules for implementing cases where the sales tax computation is overridden and no sales tax is due, such as with a tax holiday or lack of economic *nexus*, may instead be implemented as the tax override rules 2240.

Figure 23:
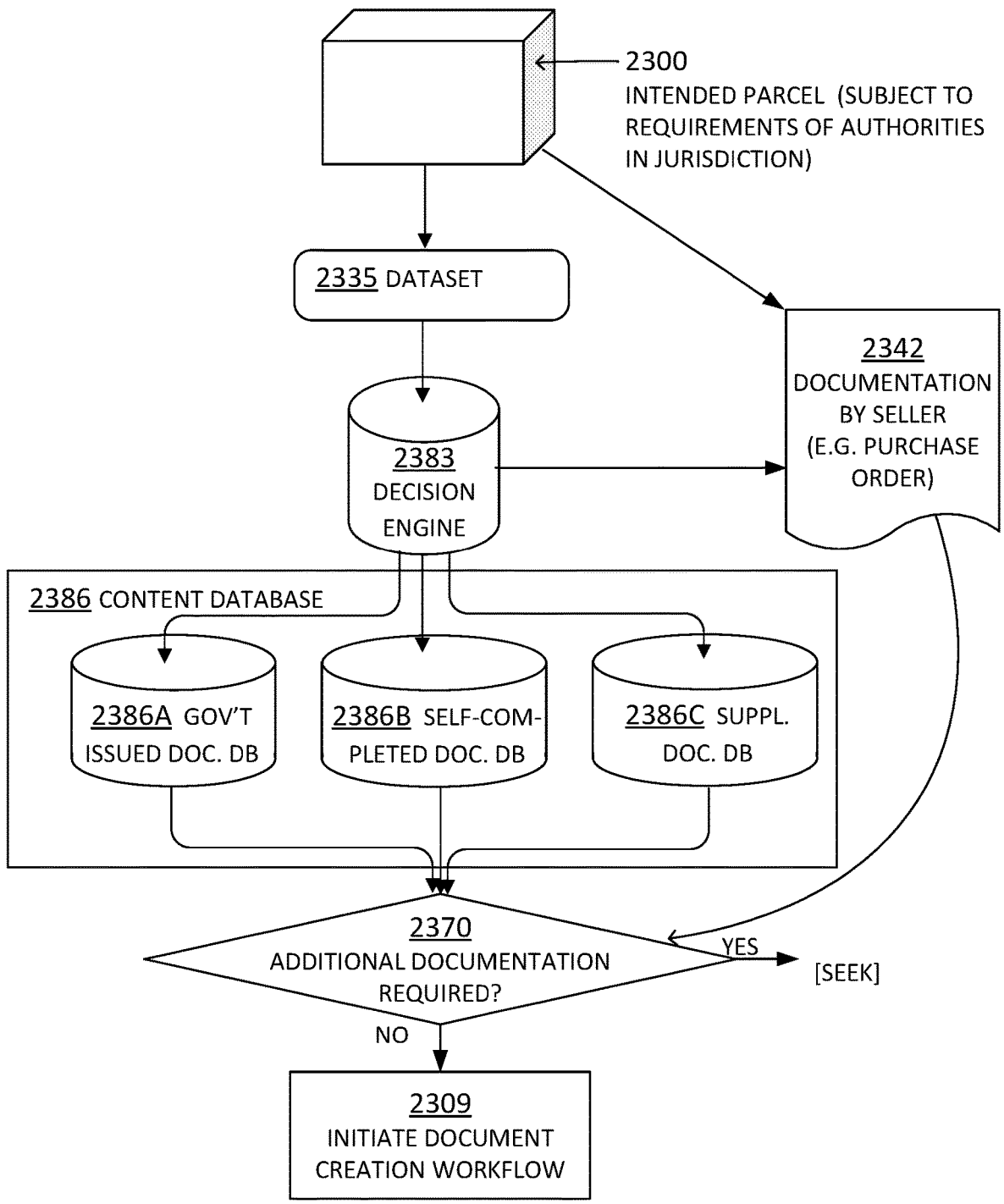
FIG. 23 is a mixed diagram for explaining a use case of embodiments.

FIG. 23 is a mixed diagram of an intended parcel 2300 and other elements for a use case of embodiments. The intended parcel 2300 may be subject to requirements of authorities, whether jurisdiction is had by virtue of the nature of the intended contents of the intended parcel 2300, or by virtue of where the parcel 2300 is intended to travel.

A dataset 2335 may represent answers to these requirements. In addition, documentation 2342 may have been provided by the seller. The documentation 2342 may be one or more documents that may have been provided via the second communication 1642, one of its parts, etc., and then parsed for their information. That information may be checked against dataset values of the dataset 2335, and so on.

A decision engine 2383 can be part of, or related to, the tax engine 2183. The decision engine 2383 can query the documentation 2342 and also a content database 2386, which can be part of, or related to, the digital tax content 2186.

In the example of FIG. 23, the content database 2386 has three components, namely a database 2386A of government issued documents, a database 2386B of documents that are to be completed by the buyer or the seller, and a database 2386C of supplemental documents.

A decision diamond 2370 can decide whether additional documentation is required for the intended parcel 2300. If yes, then that is sought, for instance with additional communications. If no, then according to an operation 2309, the document creation workflow is initiated, for preparing the digital exhibit and storing it.

Figure 24:
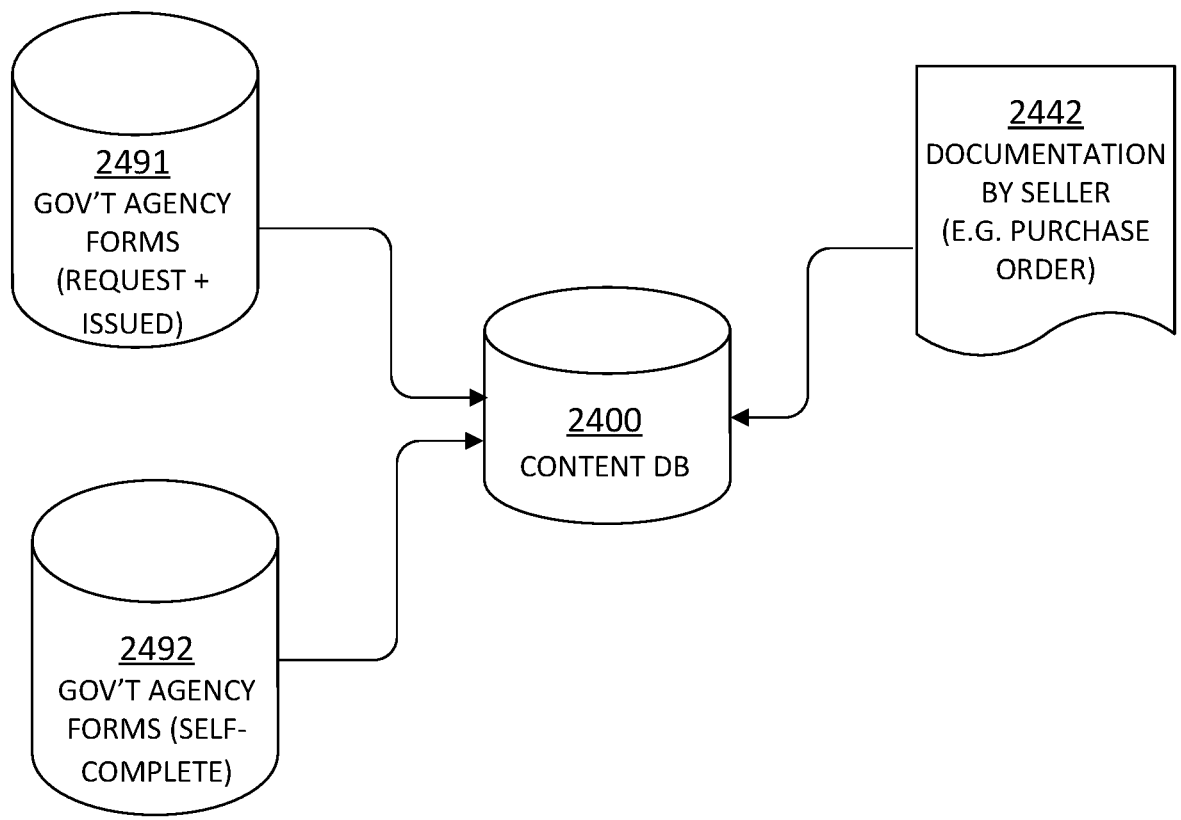
FIG. 24 is a diagram of sample components for explaining a use case of embodiments.

FIG. 24 is a diagram of sample components for enabling a use case of embodiments. A content database 2400 receives inputs from documentation 2442, if available. The documentation 2442 can be as was described for the documentation 2342, e.g. provided by the seller, in the form of a purchase order, and so on.

The content database 2400 can also receive inputs from a database 2491 of government agency forms, request plus issued. In addition, the content database 2400 can receive inputs from a database 2492 of government agency forms that are to be completed by the buyer or the seller. Instructions (not shown) can be arranged for directing entries by the dataset or by the documentation 2442 to blanks of the forms.

Figure 25:
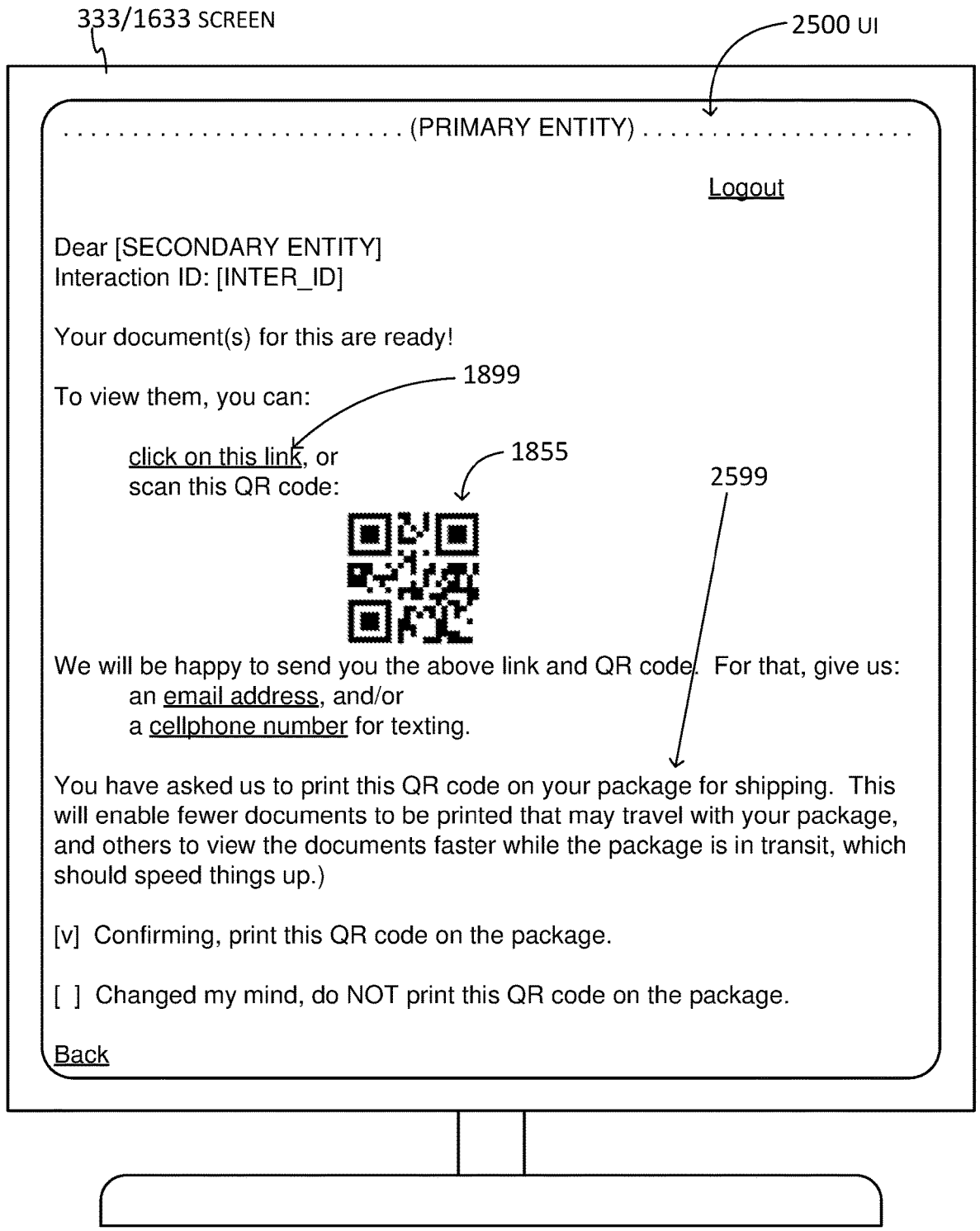
FIG. 25 is a sample view of the User Interface (UI) FIG. 18, after it is augmented to support a use case.

FIG. 25 is a sample view of a User Interface (UI) 2500. The UI 2500 is the same as the UI 1800, except that it is augmented with additional verbiage 2599 at the bottom. The verbiage 2599 gives the option to the buyer to instruct the seller to print on the package the access indicator, which is in the form of a QR code. This will support a use case, as seen below.

Figure 26:
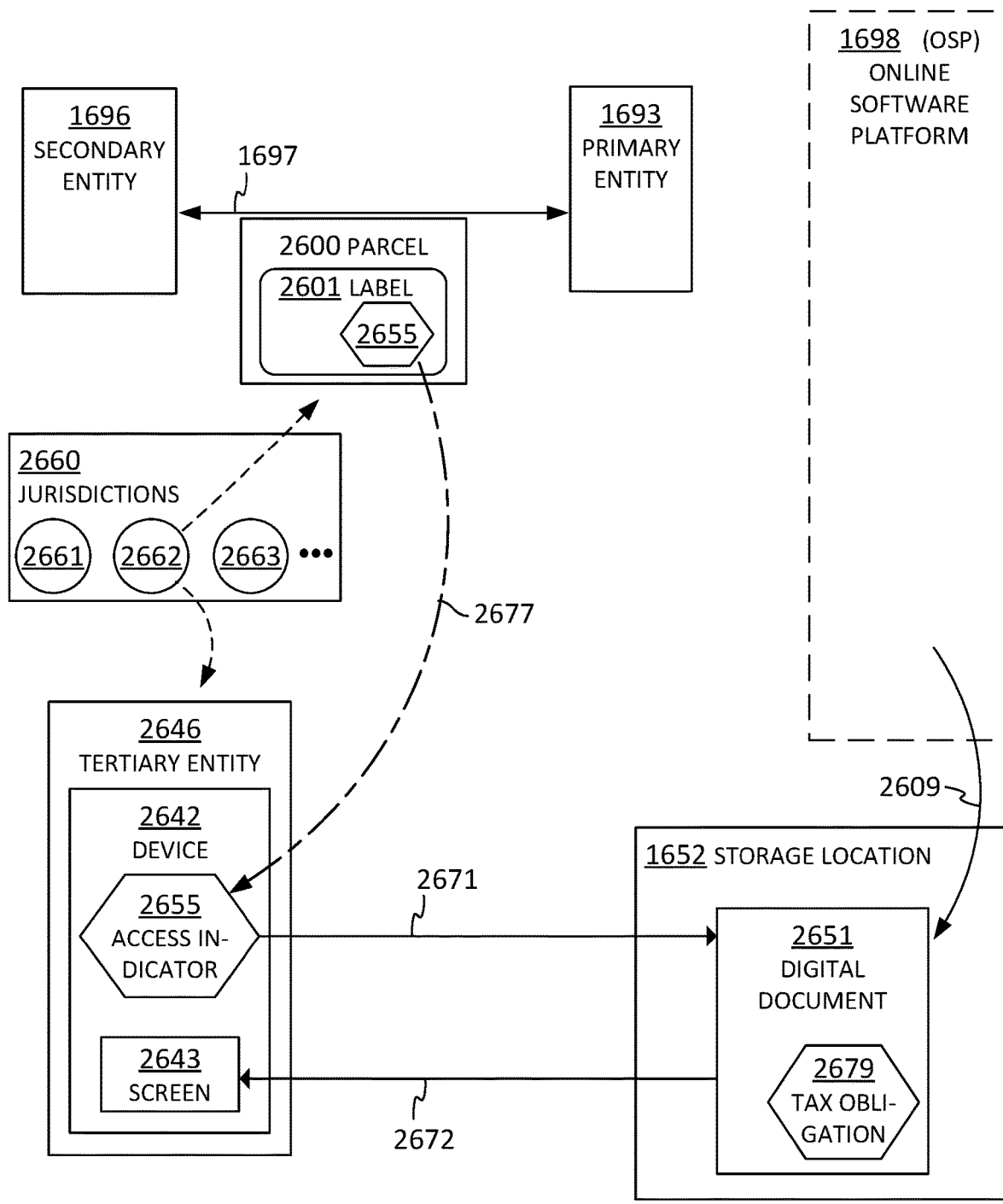
FIG. 26 is a diagram that repeats aspects of FIG. 16, and further adds elements to help describe a use case.

FIG. 26 describes a use case by repeating some aspects of FIG. 16, while omitting some of their details. The relationship instance 1697 is about a parcel 2600 that is created by the primary entity 1693 (seller), and is shipped to the secondary entity 1696 (buyer). For shipping, the parcel 2600 has an affixed label 2601.

A set 2660 of jurisdictions 2661, 2662, 2663, . . . may impose rules about taxing such shipping. Of those, the rules of the jurisdiction 2662 may specifically apply to the shipping of this example, as indicated by arrows emanating from it. The OSP 1698 has prepared a digital document 2651, which reports a tax obligation 2679 about the shipping. The digital document 2651 has been stored in the storage location 1652 per a storing arrow 2609. Moreover, the OSP 1698 has generated an access indicator 2655 that facilitates viewing the digital document 2651. As per the instructions of the screen in FIG. 25, the access indicator 2655 has been printed on the shipping label 2601. The access indicator 2655 can be a QR code.

A tertiary entity 2646 can be an agency of the jurisdiction 2662, which imposed the tax due for the shipping of this example. An agent of the tertiary entity 2646, not shown separately, has a device 2642, which can be a cellphone, a laptop, a tablet computer, and so on. The device 2642 has a screen 2643. The agent inputs the access indicator 2655 in their device 2642, according to an arrow 2677. For instance, if the device 2642 has a camera and the access indicator 2655 is a QR code, that inputting can be by scanning.

According to a look-up arrow 2671, the device 2642 can now access the digital document 2651, thanks to the access indicator 2655. According to a fetch arrow 2672, the accessed digital document 2651 becomes visible on the screen 2643. As such, the access indicator 2655 has facilitated the viewing of the digital document 2651.

FIG. 27 repeats elements seen previously in this description, for the benefit of a single, integrated view. Legislation 2780 can be about cross-border shipping.

A computer system 2795 can be as described for the computer system 195. It is equipped with business logic 2783, which can be generated in view of the legislation 2780. The business logic 2783 can be as was described for the service engine 183.

The computer system 195 stores a plurality 2710 of file templates, which can be as the plurality 2110. A database 2786 has content similar to what was described for the digital tax content 2186. A digital document 2751 is prepared, which reports the computed customs due 2779. The digital document 2751 is stored in a storage location 2752 according to a storing arrow 2709.

A Customs Agency 2746 is a government agency that has been created to enforce the legislation 2780. The Customs Agency 2746 is an example of the tertiary entity 2646. The Customs Agency 2746 processes parcels, such as a parcel 2700. The parcel 2700 has a label 2701, which operates as a shipping label. The label 2701 has an access indicator 2755, which refers to the digital document 2751 according to a reference arrow 2717.

The Customs Agency 2746 could implement a "green lane" 2777, for certain parcels to move faster, because they enable faster inspection of their documentation. The parcel 2700 would qualify because of showing the access indicator 2755, which can be used to check quickly the digital document 2751, as was shown in FIG. 26. As such, the parcel 2700 moves through the "green lane" 2777, and is thus expedited, thanks to embodiments.

FIG. 28 is a diagram of a parcel 2800, which can be as described for the parcel 2700, and is intended for cross-border shipping. The parcel 2800 has a label 2801, which operates as a shipping label. The label 2801 mentions the information of the seller 2893, the information of the buyer 2896, and has an access indicator 2855, which is a QR code. The label 2801 also has instructions 2856 for the Customs Agent.

Per the instructions 2856, the Customs Agent can use their smartphone 2842 to scan the access indicator 2855, as described in FIG. 26. When that is done, an image 2851 of the previously prepared and stored digital document appears on the screen of the smartphone 2842.

It will be appreciated that the image 2851 is a view of a form with requirements. Entries answer these requirements, such as the name of the buyer and the item contained. A requirement 2821 is how much is paid for customs due. A determined customs due obligation 2879 provides the answer to the requirement 2821.

In the methods described above, each operation can be performed as an affirmative act or operation of doing, or causing to happen, what is written that can take place. Such doing or causing to happen can be by the whole system or device, or just one or more components of it. It will be recognized that the methods and the operations may be implemented in a number of ways, including using systems, devices and implementations described above. In addition, the order of operations is not constrained to what is shown, and different orders may be possible according to different embodiments. Examples of such alternate orderings may include overlapping, interleaved, interrupted, reordered, incremental, preparatory, supplemental, simultaneous, reverse, or other variant orderings, unless context dictates otherwise. Moreover, in certain embodiments, new operations may be added, or individual operations may be modified or deleted. The added operations can be, for example, from what is mentioned while primarily describing a different system, apparatus, device or method.

At least one of the methods of this description, when implemented by a computer, can be performed at the rate of at least 10 times per second.

A person skilled in the art will be able to practice the present invention in view of this description, which is to be taken as a whole. Details have been included to provide a thorough understanding. In other instances, well-known aspects have not been described, in order to not obscure unnecessarily this description.

The technique of three dots in the drawings: The drawings associated with this document may show three dots drawn in sequence, and in any orientation. This document may refer to a shown set of such three dots as "dot-dot-dot". Where shown next to an element, this set of three dots is used to indicate possible additional such elements while omitting drawing them, which helps unclutter the drawings. This technique for the drawings is analogous to the ellipsis used in writing. In particular, an ellipsis is a punctuation mark that consists of three dots or periods ( . . . ), and is used to indicate possibly more of what it follows, perhaps in sequence, while omitting writing the possibly more.

Some technologies or techniques described in this document may be known. Even then, however, it does not necessarily follow that it is known to apply such technologies or techniques as described in this document, or for the purposes described in this document.

This description includes one or more examples, but this fact does not limit how the invention may be practiced. Indeed, examples, instances, versions or embodiments of the invention may be practiced according to what is described, or yet differently, and also in conjunction with other present or future technologies. Other such embodiments include combinations and sub-combinations of features described herein, including for example, embodiments that are equivalent to the following: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the features incorporated in such combinations and sub-combinations.

In general, the present disclosure reflects preferred embodiments of the invention. The attentive reader will note, however, that some aspects of the disclosed embodiments extend beyond the scope of the claims. To the respect that the disclosed embodiments indeed extend beyond the scope of the claims, the disclosed embodiments are to be considered supplementary background information and do not constitute definitions of the claimed invention.

In this document, the phrases "constructed to", "adapted to" and/or "configured to" denote one or more actual states of construction, adaptation and/or configuration that is fundamentally tied to physical characteristics of the element or feature preceding these phrases and, as such, reach well beyond merely describing an intended use. Any such elements or features can be implemented in a number of ways, as will be apparent to a person skilled in the art after reviewing the present disclosure, beyond any examples shown in this document.

Incorporation by reference: References and citations to other documents, such as patents, patent applications, patent publications, journals, books, papers, web contents, have been made throughout this disclosure. All such documents are hereby incorporated herein by reference in their entirety for all purposes.

Parent patent applications: Any and all parent, grandparent, great-grandparent, etc. patent applications, whether mentioned in this document or in an Application Data Sheet ("ADS") of this patent application, are hereby incorporated by reference herein as originally disclosed, including any priority claims made in those applications and any material incorporated by reference, to the extent such subject matter is not inconsistent herewith.

Reference numerals: In this description a single reference numeral may be used consistently to denote a single item, aspect, component, or process. Moreover, a further effort may have been made in the preparation of this description to use similar though not identical reference numerals to denote other versions or embodiments of an item, aspect, element, component or process that are identical, or at least similar or related. Where made, such a further effort was not required, but was nevertheless made gratuitously so as to facilitate comprehension by the reader. Even where made in this document, such a further effort might not have been made completely consistently for all of the versions or embodiments that are made possible by this description. Accordingly, the description controls in defining an item, aspect, element, component or process, rather than its reference numeral. Any similarity in reference numerals may be used to infer a similarity in the text, but not to confuse aspects where the text or other context indicates otherwise.

The claims of this document define certain combinations and subcombinations of elements, features and acts or operations, which are regarded as novel and non-obvious. The claims also include elements, features and acts or operations that are equivalent to what is explicitly mentioned. Additional claims for other such combinations and subcombinations may be presented in this or a related document. These claims are intended to encompass within their scope all changes and modifications that are within the true spirit and scope of the subject matter described herein. The terms used herein, including in the claims, are generally intended as "open" terms. For example, the term "including" should be interpreted as "including but not limited to," the term "having" should be interpreted as "having at least," etc. If a specific number is ascribed to a claim recitation, this number is a minimum but not a maximum unless stated otherwise. For example, where a claim recites "a" component or "an" item, it means that the claim can have one or more of this component or this item.

In construing the claims of this document, the inventor(s) invoke 35 U.S.C. § 112(f) only when the words "means for" or "steps for" are expressly used in the claims. Accordingly, if these words are not used in a claim, then that claim is not intended to be construed by the inventor(s) in accordance with 35 U.S.C. § 112(f).

The claimed invention is:

1. A computer system of a primary entity, the computer system including at least:
   one or more processors; and
   a non-transitory computer-readable storage medium having stored thereon instructions which, when executed by the one or more processors, are designed to result in operations including at least:
   receiving, by the computer system via a communications network, a first communication from a device of a secondary entity that is distinct from the computer system, the secondary entity distinct from the primary entity, the first communication including data about a relationship instance between the primary entity and the secondary entity, a certain domain being associated with one of the primary entity and the secondary entity, the certain domain being one of a plurality of domains;
   causing to be transmitted, by the computer system via a communications network and responsive to receiving the first communication, a second communication to a service engine of an Online Service Provider (OSP), the service engine distinct from the computer system, the second communication including a dataset having dataset parameters, at least some of the dataset parameters having respective dataset values about the relationship instance, at least one of the dataset parameters being a domain dataset parameter that has a domain dataset value that characterizes the certain domain, the second communication programmed to cause the service engine to:
   parse the domain dataset parameter to identify the certain domain,
   access a plurality of stored file templates that mention one or more requirements, at least some of the stored file templates being associated with respective ones of the plurality of domains,
   select, responsive to at least the domain dataset value, one of the stored file templates that is related to the certain domain,
   identify one of the requirements mentioned in the selected file template,
   access stored digital resource rules,
   select, responsive to one or more of the dataset values, a certain one of the accessed digital resource rules,
   produce, by the service engine applying the certain digital resource rule to at least one of the dataset values, a resource for the identified requirement,
   prepare, from the selected file template, a digital exhibit that is arranged to report the resource as answering the identified requirement, the prepared digital exhibit being stored in a storage location of a memory of the computer system,
   input an access indicator adapted to facilitate viewing the digital exhibit when the digital exhibit is stored in the storage location, and
   cause to be transmitted to the computer system a third communication, the third communication including the access indicator;
   receiving, by the computer system, the third communication that is caused to be transmitted by the service engine; and
   causing to be transmitted, by the computer system and responsive to the received third communication, a fourth communication to the device of the secondary entity, the fourth communication including the access indicator.

2. The computer system of claim 1, in which:
the access indicator includes a QR (Quick Response) code.

3. The computer system of claim 1, in which:
the access indicator includes a link that leads to the storage location.

4. The computer system of claim 1, in which:
the access indicator includes a link that leads to the storage location, and
a passcode is further required to access the storage location.

5. The computer system of claim 1, in which:
the access indicator is a QR (Quick Response) code that includes a link that leads to the storage location.

6. The computer system of claim 1, in which:
the access indicator includes a link that leads to the digital exhibit, when the digital exhibit is stored in the storage location.

7. The computer system of claim 1, in which:
the access indicator is a QR (Quick Response) code that includes a link that leads to the digital exhibit, when the digital exhibit is stored in the storage location.

8. The computer system of claim 1, in which:
the fourth communication also includes the produced resource.

9. The computer system of claim 1, in which:
the access indicator includes a QR (Quick Response) code that includes a link that leads to the storage location or to the digital exhibit when the digital exhibit is stored in the storage location, and
the third communication is an email that includes the QR code.

10. The computer system of claim 1, in which:
the first communication includes an electronic signature made by the secondary entity, and
the digital exhibit includes the electronic signature.

11. The computer system of claim 1, in which:
the first communication includes a network address, and
the fourth communication is caused to be transmitted to the network address.

12. The computer system of claim 11, in which:
the access indicator includes a QR (Quick Response) code that includes a link that leads to the storage location or to the digital exhibit when the digital exhibit is stored in the storage location.

* * * * *